United States Patent
Huang et al.

(10) Patent No.: US 11,776,097 B2
(45) Date of Patent: Oct. 3, 2023

(54) IMAGE FUSION METHOD, MODEL TRAINING METHOD, AND RELATED APPARATUSES

(71) Applicant: Tencent Technology (Shenzhen) Company Limited, Shenzhen (CN)

(72) Inventors: Haozhi Huang, Shenzhen (CN); Senzhe Xu, Shenzhen (CN); Shimin Hu, Shenzhen (CN); Wei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 318 days.

(21) Appl. No.: 17/336,561

(22) Filed: Jun. 2, 2021

(65) Prior Publication Data
US 2021/0295483 A1 Sep. 23, 2021

Related U.S. Application Data

(63) Continuation of application No. PCT/CN2020/075641, filed on Feb. 18, 2020.

(30) Foreign Application Priority Data

Feb. 26, 2019 (CN) .......................... 201910142210.7

(51) Int. Cl.
*G06T 5/50* (2006.01)
*G06N 3/04* (2023.01)
*G06N 3/08* (2023.01)

(52) U.S. Cl.
CPC .................. *G06T 5/50* (2013.01); *G06N 3/04* (2013.01); *G06N 3/08* (2013.01);
(Continued)

(58) Field of Classification Search
None
See application file for complete search history.

(56) References Cited

U.S. PATENT DOCUMENTS

| | | | |
|---|---|---|---|
| 2011/0147588 A1* | 6/2011 | Chaudhuri | ............... G06T 5/50 250/334 |
| 2019/0005069 A1 | 1/2019 | de Araujo et al. | |

FOREIGN PATENT DOCUMENTS

| | | | | |
|---|---|---|---|---|
| CN | 108460411 A | * | 8/2018 | ........... G06K 9/3233 |
| CN | 108960345 A | * | 12/2018 | |

(Continued)

OTHER PUBLICATIONS

Rui Yu, Zhichao Zhou, Song Bai, Xiang Bai, "Divide and Fuse: A Re-ranking Approach for Person Re-identification", arXiv: 1708.04169v1 [cs.CV] Aug. 11, 2017.*

(Continued)

*Primary Examiner* — Jiangeng Sun
(74) *Attorney, Agent, or Firm* — Crowell & Moring LLP

(57) ABSTRACT

Methods, devices, and storage medium for fusing at least one image are disclosed. The method includes obtaining a first to-be-fused image and a second to-be-fused image, the first to-be-fused image comprising first regions, and the second to-be-fused image comprising second regions; obtaining a first feature set according to the first to-be-fused image and obtaining a second feature set according to the second to-be-fused image; performing first fusion processing on the first to-be-fused image and the second to-be-fused image by using a shape fusion network model to obtain a third to-be-fused image, the third to-be-fused image comprising at least one first encoding feature and at least one second encoding feature; and performing second fusion processing on the third to-be-fused image and the first to-be-fused image by using a condition fusion network (Continued)

model to obtain a target fused image. Model training methods, apparatus, and storage medium are also disclosed.

17 Claims, 15 Drawing Sheets

(52) U.S. Cl.
CPC .............. *G06T 2207/20081* (2013.01); *G06T 2207/20084* (2013.01); *G06T 2207/20221* (2013.01)

(56) References Cited

FOREIGN PATENT DOCUMENTS

| | | | | |
|---|---|---|---|---|
| CN | 108960345 | A | 12/2018 | |
| CN | 109002852 | A | 12/2018 | |
| CN | 109005852 | A | 12/2018 | |
| CN | 109377448 | A | * 2/2019 | ............. G06T 5/005 |
| CN | 109377448 | A | 2/2019 | |
| CN | 109919888 | A | 6/2019 | |
| WO | WO-2020233333 | A1 | * 11/2020 | ......... G06K 9/00268 |

OTHER PUBLICATIONS

Extended European Search Report regarding EP 20 763 746.3 dated Mar. 17, 2022, 7 pages.
Nirkin et al., "On Face Segmentation, Face Swapping, and Face Perception," 2018 13th IEEE International Conference on Automatic Face & Gesture Recognition, IEEE, May 15, 2018, pp. 98-105.
Natsume et al., "FSNet: An Identity-Aware Generative Model for Image-based Face Swapping," Arxiv.Org, Cornell University Library, Ithaca, NY, Nov. 30, 2018, 20 gages.
Chinese Office Action with English concise explanation of relevance regarding 2019101422107 dated Jun. 2, 2023, 7 pages.
International Search Report and Written Opinion with English translation regarding PCT/CN2020/075641 dated May 20, 2020, 10 pages.

* cited by examiner

IMAGE FUSION METHOD, MODEL TRAINING METHOD, AND RELATED APPARATUSES

RELATED APPLICATION

This application is a continuation application of PCT Patent Application No. PCT/CN2020/075641, filed on Feb. 18, 2020, which claims priority to Chinese Patent Application No. 201910142210.7, filed with the China National Intellectual Property Administration on Feb. 26, 2019, both of which are incorporated herein by reference in their entireties.

FIELD OF THE TECHNOLOGY

This application relates to the field of artificial intelligence (AI) technologies, and in particular, to an image fusion method, a model training method, and related apparatuses.

BACKGROUND OF THE DISCLOSURE

Artificial Intelligence (AI) is a theory, method, technology, and application system that uses a digital computer or a machine controlled by the digital computer to simulate, extend, and expand human intelligence, perceive an environment, acquire knowledge, and use knowledge to obtain an optimal result. In other words, the AI is a comprehensive technology of computer science, which attempts to understand essence of intelligence and produces a new intelligent machine that can respond in a manner similar to human intelligence. The AI is to study the design principles and implementation methods of various intelligent machines, to enable the machines to have the functions of perception, reasoning, and decision-making.

The AI technology is a comprehensive discipline, and relates to a wide range of fields including a hardware-level technology and a software-level technology. Basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning/deep learning.

The CV is a science that studies how to use a machine to "see", and furthermore, that uses a camera and a computer to replace human eyes to perform machine vision such as recognition, tracking, and measurement on a target, and further perform graphic processing, so that the computer processes the target into an image more suitable for human eyes to observe, or an image transmitted to an instrument for detection. As a scientific discipline, the CV studies related theories and technologies and attempts to establish an AI system that can obtain information from images or multi-dimensional data. The CV technologies generally include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biological feature recognition technologies such as common face recognition and fingerprint recognition.

Face fusion is a technology depending on a face recognition algorithm and a deep learning engine to quickly and accurately position facial landmarks and perform face-level fusion on a photo uploaded by a user and a specific image, to cause a generated picture to have appearance characteristics of both the user and the specific image. During face fusion, recognition on the uploaded photo is supported, which may improve the security of activities and reduce a risk of transaction infractions.

Currently, the face fusion technology mainly generates images by using an adversarial neural network. An unsupervised learning method is used when a face image is disentangled, that is, features in the face image are divided into a plurality of chunks, each chunk individually encodes features of one aspect, and a fused face image is finally generated.

However, the face image generated by using the adversarial neural network cannot ensure consistency between an identity of the face image and an originally inputted identity. As a result, the accuracy of face recognition is reduced. In addition, the unsupervised learning method is adopted in a process of encoding. As a result, only the independence of each chunk can be ensured, but meanings represented by each chunk cannot be determined, which is adverse to the flexibility of image fusion.

The present disclosure describes various embodiment for fusing at least one image, addressing one or more problem/issue discussed above, and thus, improves the accuracy of face fusion and recognition, and improves flexibility of image fusion.

SUMMARY

Embodiments of this application provide an image fusion method, a model training method, and related apparatuses, which may quickly change a local region in an image to form a fused image, and there is no change between identity information of the fused image and identity information of an originally inputted image.

The present disclosure describes a method for fusing at least one image. The method includes obtaining, by a device, a first to-be-fused image and a second to-be-fused image, the first to-be-fused image comprising a plurality of first regions, and the second to-be-fused image comprising a plurality of second regions. The device includes a memory storing instructions and a processor in communication with the memory. The method also includes obtaining, by the device, a first feature set according to the first to-be-fused image and obtaining a second feature set according to the second to-be-fused image, the first feature set comprising a plurality of first encoding features and the second feature set comprising a plurality of second encoding features, the plurality of the first encoding features being in a one-to-one correspondence with the plurality of the first regions and the plurality of the second encoding features being in a one-to-one correspondence with the plurality of the second regions; performing, by the device, first fusion processing on the first to-be-fused image and the second to-be-fused image by using a shape fusion network model to obtain a third to-be-fused image, the third to-be-fused image comprising at least one first encoding feature and at least one second encoding feature; and performing, by the device, second fusion processing on the third to-be-fused image and the first to-be-fused image by using a condition fusion network model to obtain a target fused image.

The present disclosure also describes an apparatus for fusing at least one image, the apparatus includes a memory storing instructions; and a processor in communication with the memory. When the processor executes the instructions, the processor is configured to cause the apparats to: obtain a first to-be-fused image and a second to-be-fused image, the first to-be-fused image comprising a plurality of first regions, and the second to-be-fused image comprising a plurality of second regions, obtain a first feature set according to the first to-be-fused image and obtain a second feature set according to the second to-be-fused image, the first feature set comprising a plurality of first encoding features and the second feature set comprising a plurality of second encoding features, the plurality of the first encoding features being in a one-to-one correspondence with the plurality of the first regions and the plurality of the second encoding features being in a one-to-one correspondence with the plurality of the second regions, perform first fusion processing on the first to-be-fused image and the second to-be-fused image by using a shape fusion network model to obtain a third to-be-fused image, the third to-be-fused image comprising at least one first encoding feature and at least one second encoding feature, and perform second fusion processing on the third to-be-fused image and the first to-be-fused image by using a condition fusion network model to obtain a target fused image.

The present disclosure also describes a non-transitory computer-readable storage medium storing computer readable instructions. The computer readable instructions, when executed by a processor, are configured to cause the processor to perform: obtaining a first to-be-fused image and a second to-be-fused image, the first to-be-fused image comprising a plurality of first regions, and the second to-be-fused image comprising a plurality of second regions; obtaining a first feature set according to the first to-be-fused image and obtaining a second feature set according to the second to-be-fused image, the first feature set comprising a plurality of first encoding features and the second feature set comprising a plurality of second encoding features, the plurality of the first encoding features being in a one-to-one correspondence with the plurality of the first regions and the plurality of the second encoding features being in a one-to-one correspondence with the plurality of the second regions; performing first fusion processing on the first to-be-fused image and the second to-be-fused image by using a shape fusion network model to obtain a third to-be-fused image, the third to-be-fused image comprising at least one first encoding feature and at least one second encoding feature; and performing second fusion processing on the third to-be-fused image and the first to-be-fused image by using a condition fusion network model to obtain a target fused image.

In view of this, a first aspect of this application provides an image fusion method, performed by a terminal device, the method including:

obtaining a first to-be-fused image and a second to-be-fused image, the first to-be-fused image including a plurality of first regions, and the second to-be-fused image including a plurality of second regions;

obtaining a first feature set according to the first to-be-fused image and obtaining a second feature set according to the second to-be-fused image, the first feature set including a plurality of first encoding features and the first encoding features being in a one-to-one correspondence with the first regions, and the second feature set including a plurality of second encoding features and the second encoding features being in a one-to-one correspondence with the second regions;

performing fusion processing on the first to-be-fused image and the second to-be-fused image by using a shape fusion network model to obtain a third to-be-fused image, the third to-be-fused image including at least one first encoding feature and at least one second encoding feature; and performing fusion processing on the third to-be-fused image and the first to-be-fused image by using a condition fusion network model to obtain a target fused image.

A second aspect of this application provides a model training method, performed by a server device, the method including:

obtaining a first feature set of a first to-be-trained image and a second feature set of a second to-be-trained image, the first to-be-trained image including a plurality of first training regions, the second to-be-trained image including a plurality of second training regions, the first feature set including a plurality of first encoding features and the first encoding features being in a one-to-one correspondence with the first training regions, and the second feature set including a plurality of second encoding features and the second encoding features being in a one-to-one correspondence with the second training regions;

performing fusion processing on the first to-be-trained image and the second to-be-trained image by using a to-be-trained shape fusion network model to obtain a third to-be-trained image, the third to-be-trained image including at least one first encoding feature and at least one second encoding feature;

performing fusion processing on the third to-be-trained image and the first to-be-trained image by using a to-be-trained condition fusion network model to obtain a fourth to-be-trained image;

performing fusion processing on the fourth to-be-trained image and the first to-be-trained image by using the to-be-trained shape fusion network model to obtain a fifth to-be-trained image, the fifth to-be-trained image and the first to-be-trained image having corresponding features;

performing fusion processing on the fifth to-be-trained image and the fourth to-be-trained image by using the to-be-trained condition fusion network model to obtain a target image; and training the to-be-trained shape fusion network model and the to-be-trained condition fusion network model by using a target loss function and the target image to obtain a shape fusion network model and a condition fusion network model.

A third aspect of this application provides an image fusion apparatus, including:

an obtaining module, configured to obtain a first to-be-fused image and a second to-be-fused image, the first to-be-fused image including a plurality of first regions, and the second to-be-fused image including a plurality of second regions; and the obtaining module being further configured to obtain a first feature set according to the first to-be-fused image and obtain a second feature set according to the second to-be-fused image, the first feature set including a plurality of first encoding features and the first encoding features being in a one-to-one correspondence with the first regions, and the second feature set including a plurality of second encoding features and the second encoding features being in a one-to-one correspondence with the second regions; and a fusion module, configured to perform fusion processing on the first to-be-fused image and the second to-be-fused image by using a shape fusion network model to obtain a third to-be-fused image, the third to-be-fused image including at least one first encoding feature and at least one second encoding feature that are obtained by the obtaining module; and the fusion module being further configured to perform fusion processing on the third to-be-fused image and the first to-be-fused image by using a condition fusion network model to obtain a target fused image.

A fourth aspect of this application provides a model training apparatus, including:

an obtaining module, configured to obtain a first feature set of a first to-be-trained image and a second feature set of a second to-be-trained image, the first to-be-trained image including a plurality of first training regions, the second to-be-trained image including a plurality of second training regions, the first feature set including a plurality of first encoding features and the first encoding features being in a one-to-one correspondence with the first training regions, and the second feature set including a plurality of second encoding features and the second encoding features being in a one-to-one correspondence with the second training regions;

a fusion module, configured to perform, by using a to-be-trained shape fusion network model, fusion processing on the first to-be-trained image and the second to-be-trained image that are obtained by the obtaining module to obtain a third to-be-trained image, the third to-be-trained image including at least one first encoding feature and at least one second encoding feature that are obtained by the obtaining module;

the fusion module being further configured to perform fusion processing on the third to-be-trained image and the first to-be-trained image by using a to-be-trained condition fusion network model to obtain a fourth to-be-trained image;

the fusion module being further configured to perform fusion processing on the fourth to-be-trained image and the first to-be-trained image by using the to-be-trained shape fusion network model to obtain a fifth to-be-trained image, the fifth to-be-trained image and the first to-be-trained image having corresponding features; and the fusion module being further configured to perform fusion processing on the fifth to-be-trained image and the fourth to-be-trained image by using the to-be-trained condition fusion network model to obtain a target image; and a training module, configured to train the to-be-trained shape fusion network model and the to-be-trained condition fusion network model by using a target loss function and the target image obtained through fusion of the fusion module to obtain a shape fusion network model and a condition fusion network model.

A fifth aspect of this application provides a terminal device, including a memory and a processor, the memory being configured to store a plurality of instructions, and when executing the plurality of instructions stored in the memory, the processor being configured to perform the following operations:

obtaining a first to-be-fused image and a second to-be-fused image, the first to-be-fused image including a plurality of first regions, and the second to-be-fused image including a plurality of second regions;

obtaining a first feature set according to the first to-be-fused image and obtaining a second feature set according to the second to-be-fused image, the first feature set including a plurality of first encoding features and the first encoding features being in a one-to-one correspondence with the first regions, and the second feature set including a plurality of second encoding features and the second encoding features being in a one-to-one correspondence with the second regions;

performing fusion processing on the first to-be-fused image and the second to-be-fused image by using a shape fusion network model to obtain a third to-be-fused image, the third to-be-fused image including at least one first encoding feature and at least one second encoding feature; and performing fusion processing on the third to-be-fused image and the first to-be-fused image by using a condition fusion network model to obtain a target fused image.

A sixth aspect of this application provides a server device, including a memory and a processor, the memory being configured to store a plurality of instructions, and when executing the plurality of instructions stored in the memory, the processor being configured to perform the following operations:

obtaining a first feature set of a first to-be-trained image and a second feature set of a second to-be-trained image, the first to-be-trained image including a plurality of first training regions, the second to-be-trained image including a plurality of second training regions, the first feature set including a plurality of first encoding features and the first encoding features being in a one-to-one correspondence with the first training regions, and the second feature set including a plurality of second encoding features and the second encoding features being in a one-to-one correspondence with the second training regions;

performing fusion processing on the first to-be-trained image and the second to-be-trained image by using a to-be-trained shape fusion network model to obtain a third to-be-trained image, the third to-be-trained image including at least one first encoding feature and at least one second encoding feature;

performing fusion processing on the third to-be-trained image and the first to-be-trained image by using a to-be-trained condition fusion network model to obtain a fourth to-be-trained image;

performing fusion processing on the fourth to-be-trained image and the first to-be-trained image by using the to-be-trained shape fusion network model to obtain a fifth to-be-trained image, the fifth to-be-trained image and the first to-be-trained image having corresponding features;

performing fusion processing on the fifth to-be-trained image and the fourth to-be-trained image by using the to-be-trained condition fusion network model to obtain a target image; and training the to-be-trained shape fusion network model and the to-be-trained condition fusion network model by using a target loss function and the target image to obtain a shape fusion network model and a condition fusion network model.

A seventh aspect of this application provides a computer-readable storage medium, the computer-readable storage medium storing instructions, the instructions, when run on a

DESCRIPTION OF EMBODIMENTS

Embodiments of this application provide an image fusion method, a model training method, and related apparatuses, which may quickly change a local region in an image to form a fused image, and there is no change between identity information of the fused image and identity information of an originally inputted image.

In the specification, claims, and accompanying drawings of this application, the terms "first", "second", "third", "fourth", and so on (if existing) are intended to distinguish between similar objects rather than describe a specific order or sequence. It is to be understood that data used in this way is interchangeable in a suitable case, so that the embodiments of this application described herein can be implemented in a sequence in addition to the sequence shown or described herein. In addition, the terms "include", "corresponding to" and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

It is to be understood that, this application may be applied to an image synthesis scenario. Specifically, the image synthesis scenario may be a face synthesis scenario in which a computer synthesizes a virtual simulated face image. Virtual synthesis of face images is an important technology in new-generation human-computer interaction, is also a research direction that is quite active currently at home and abroad, and is widely watched and applied to aspects of computer graphics and computer vision (CV). Potential application fields of virtual synthesis include narrow-band video transmission, computer-assisted instruction, film special effect making, music television (MTV) special effect making, game production, virtual reality, artificial intelligence (AI), robots, and the like. In terms of face image synthesis technologies, methods proposed by different researchers in different application fields greatly differ from each other. The face virtual synthesis technology will become an important component in the human-computer interaction field. Ultimate objectives of development of the human-computer interaction technology are: first, making a computer increasingly intelligent and easy to use; and second, achieving intelligent perception of robots.

Figure 1:
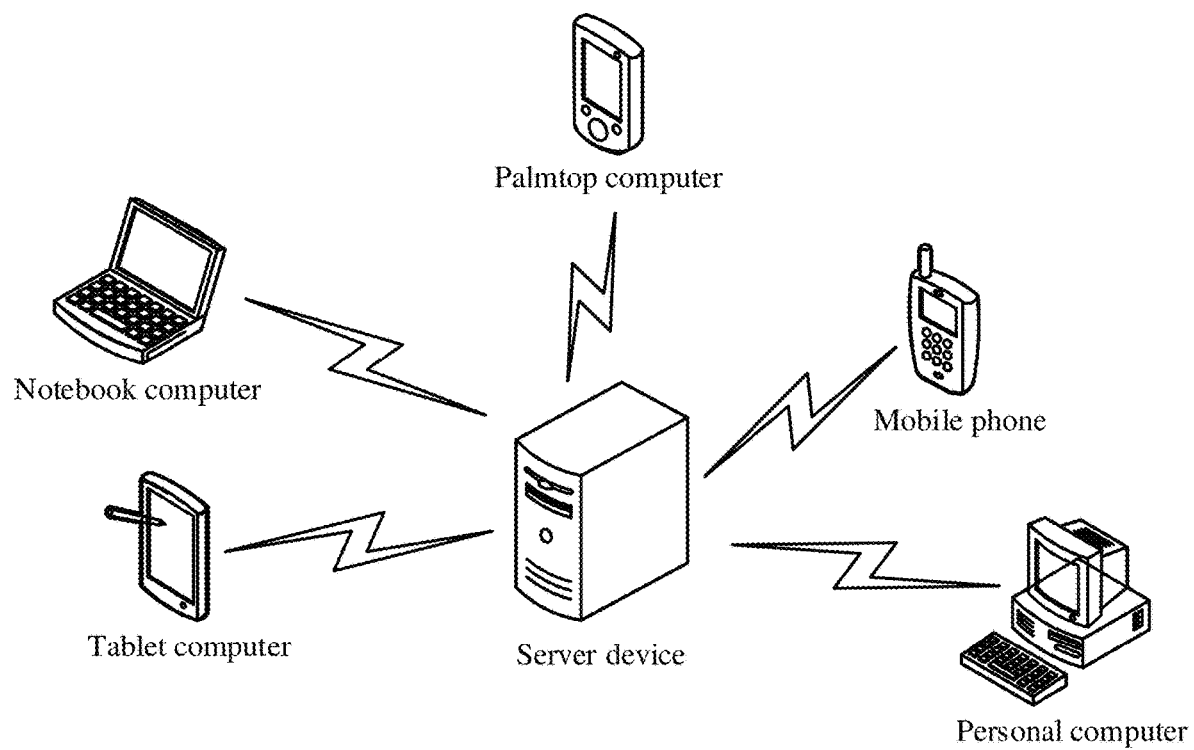
FIG. 1 is a schematic architectural diagram of an image fusion system according to an embodiment of this application.

For ease of understanding, this application provides an image fusion method, and the method is applied to an image fusion system shown in FIG. 1. Referring to FIG. 1, FIG. 1 is a schematic architectural diagram of an image fusion system according to an embodiment of this application. As shown in the figure, a client first takes images such as a face image of a user A and a face image of a user B, and inputs one of the images, for example, inputs the face image of the user A. The client may process the face image of the user A locally, or may send the face image of the user A to a server device, and the server device processes the face image of the user A. A processing manner is mainly to encode the face image of the user A first and use different part-wise encoders to encode shapes of different parts respectively such as eyes, a nose, a mouth, eyebrows, a face, hair, and a body. For example, a part-wise encoder for hair outputs a 1*1*128 one-dimensional feature vector. A feature vector of one part in the face image of the user A is replaced with a corresponding feature vector in the face image of the user B by using a shape fusion network model, all feature vectors are then combined into a whole feature vector, and the whole feature vector is decoded into a fused face by using an overall decoder. The edited fused face is then converted into a generated virtual face image by using a condition fusion network model, and the condition fusion network model also uses the originally inputted image as a condition input. In the virtual face image generated in this application, a shape of one part of an inputted face image is modified without losing identity information of the inputted face image.

The client is deployed on a terminal device. The terminal device includes, but is not limited to, a tablet computer, a notebook computer, a palmtop computer, a mobile phone, a voice interaction device, and a personal computer (PC), and is not limited herein. The voice interaction device includes, but is not limited to a smart sound and a smart home appliance.

Figure 2:
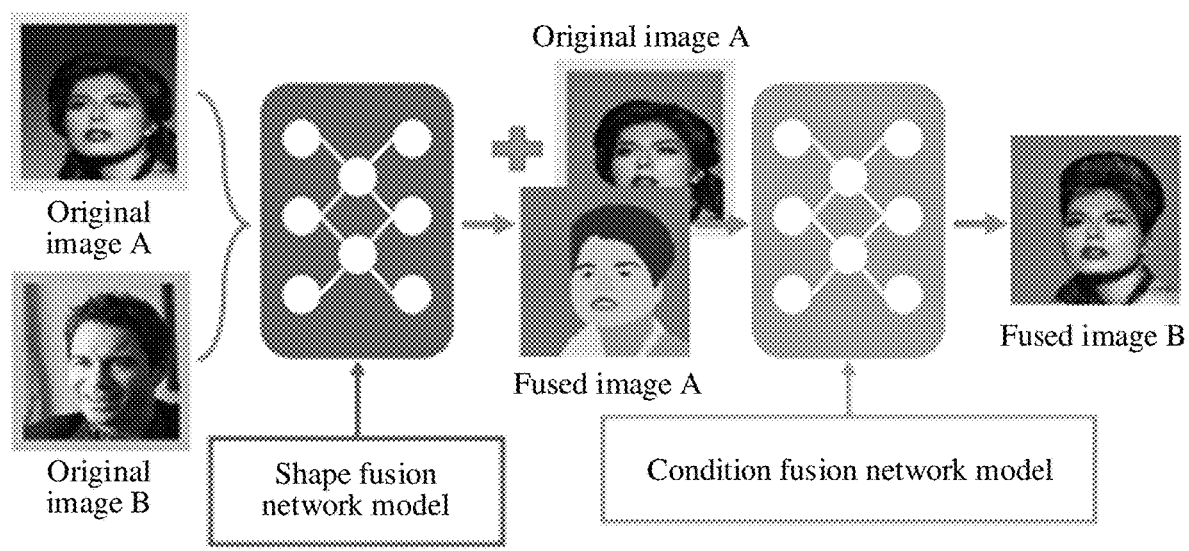
FIG. 2 is a schematic flowchart of an overall framework of an image fusion system according to an embodiment of this application.

The following describes the image fusion system with reference to FIG. 2. Referring to FIG. 2, FIG. 2 is a schematic flowchart of an overall framework of an image fusion system according to an embodiment of this application. As shown in the figure, a synthesized face picture of which shapes of different parts come from two faces respectively may be generated by exchanging feature codes of different faces. If a hair feature of an original image A needs to be replaced with a hair feature of an original image B, the hair feature of the original image A is first replaced with the hair feature of the original image B by using a shape fusion network model, and then a face of a user A having a specified hair style is generated by using a condition fusion network model, that is, a fused image B is obtained. This application may perform control to generate a face of the user A having a hair style of a user B. In addition, this method also provides support in generating a face image of which a shape of a specific part is specified directly. For example, a user may directly specify a hair style of a face image A (for example, by drawing a range) to generate a face of the user A having the hair style specified by the user.

Figure 3:
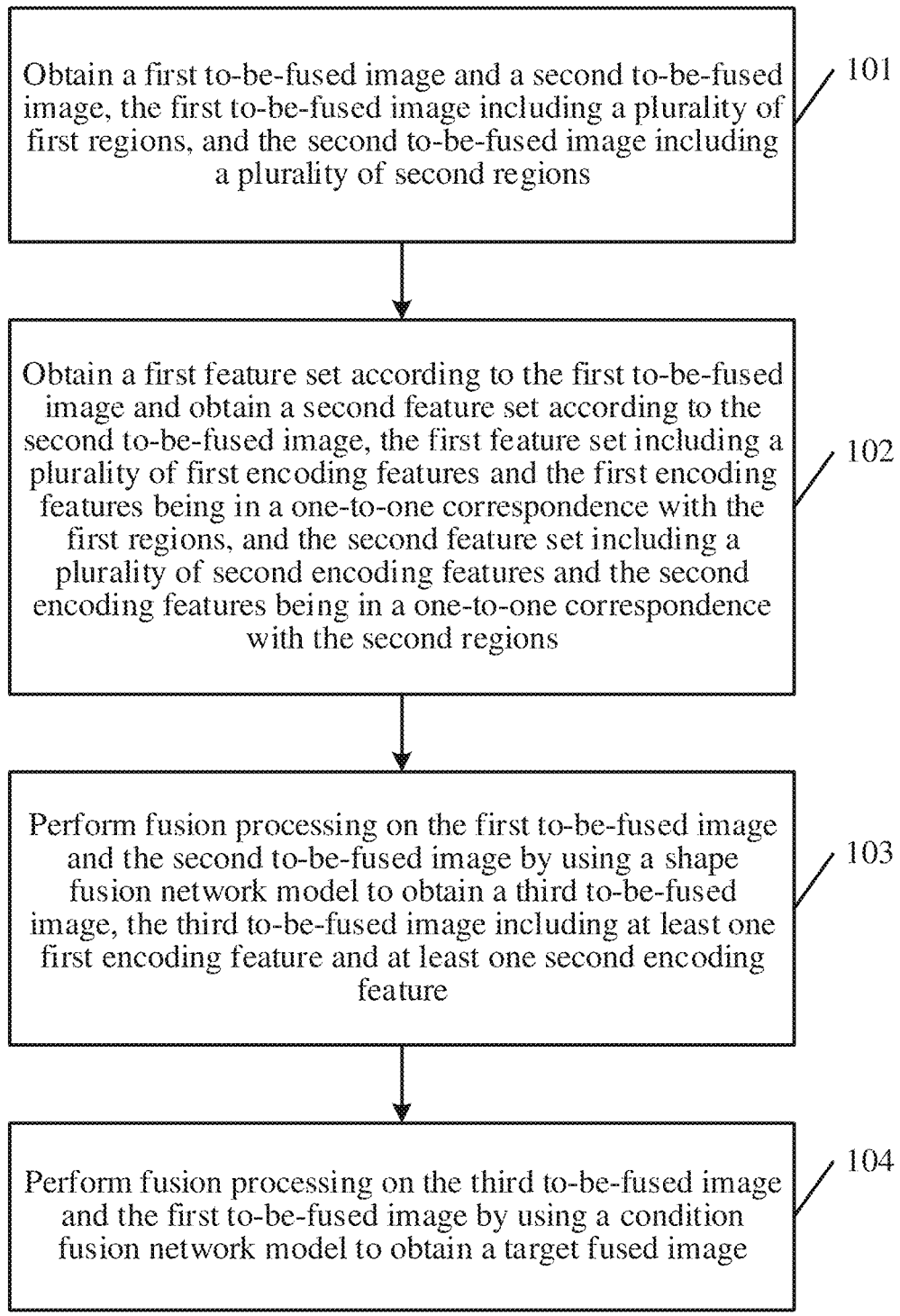
FIG. 3 is a schematic diagram of an embodiment of an image fusion method according to an embodiment of this application.

The following describes an image fusion method in this application with reference to the foregoing description. Referring to FIG. 3, the image fusion method according to an embodiment of this application is performed by a terminal device shown in FIG. 16, and one embodiment of the method includes the following steps:

101. Obtain a first to-be-fused image and a second to-be-fused image, the first to-be-fused image including a plurality of first regions, and the second to-be-fused image including a plurality of second regions.

In this embodiment, an image fusion apparatus obtains a first to-be-fused image and a second to-be-fused image. The first to-be-fused image and the second to-be-fused image are generally images of the same type. For example, both of the two images are face images, both of the two images are animal images, both of the two images are landscape images, or one of the two images is a face image and the other is an animal image. Description is made by using an example in which both of the two images are face images in this embodiment. However, this is not to be understood as a limitation on this application.

Both the first to-be-fused image and the second to-be-fused image include a plurality of regions. Specifically, the first to-be-fused image and the second to-be-fused image have similar regions. For example, the first to-be-fused image includes a plurality of first regions, and the first regions include eyes, a nose, a mouth, eyebrows, a face, hair, a body, and the like. The second to-be-fused image includes a plurality of second regions, and the second regions include eyes, a nose, a mouth, eyebrows, a face, hair, a body, and the like.

102. Obtain a first feature set according to the first to-be-fused image and obtain a second feature set according to the second to-be-fused image, the first feature set including a plurality of first encoding features and the first encoding features being in a one-to-one correspondence with the first regions, and the second feature set including a plurality of second encoding features and the second encoding features being in a one-to-one correspondence with the second regions.

In this embodiment, the image fusion apparatus needs to perform feature extraction on the first to-be-fused image and the second to-be-fused image respectively, that is, extracts corresponding features of the first regions in the first to-be-fused image to obtain the first encoding features. For example, a first encoding feature of an eye part may be extracted for the eye part of the first to-be-fused image, a first encoding feature of a hair part may be extracted for the hair part of the first to-be-fused image, and by analogy, a first feature set including a plurality of first encoding features is finally obtained. A second encoding feature of an eye part may be extracted for the eye part of the second to-be-fused image, a second encoding feature of a hair part may be extracted for the hair part of the second to-be-fused image, and by analogy, a second feature set including a plurality of second encoding features is finally obtained.

103. Perform fusion processing on the first to-be-fused image and the second to-be-fused image by using a shape fusion network model to obtain a third to-be-fused image, the third to-be-fused image including at least one first encoding feature and at least one second encoding feature.

In this embodiment, the image fusion apparatus inputs the first to-be-fused image and the second to-be-fused image into a shape fusion network model, and the shape fusion network model outputs a third to-be-fused image. The third to-be-fused image herein includes both the first encoding features in the first to-be-fused image and the second encoding features in the second to-be-fused image.

104. Perform fusion processing on the third to-be-fused image and the first to-be-fused image by using a condition fusion network model to obtain a target fused image.

In this embodiment, the image fusion apparatus inputs the third to-be-fused image and the first to-be-fused image into a condition fusion network model, and the condition fusion network model outputs a target fused image. The target fused image and the originally inputted first to-be-fused image belong to the same identity. That is, the remaining parts other than edited parts in a generated virtual image are consistent with those in the originally inputted face image, causing the user to feel that there is no change between identity information of the generated virtual face image and identity information of the originally inputted face image.

In this embodiment of this application, an image fusion method is provided. First, a first to-be-fused image and a second to-be-fused image are obtained, where the first to-be-fused image includes a plurality of first regions, and the second to-be-fused image includes a plurality of second regions. Then a first feature set is obtained according to the first to-be-fused image and a second feature set is obtained according to the second to-be-fused image, where the first feature set includes a plurality of first encoding features and the first encoding features are in a one-to-one correspondence with the first regions, and the second feature set includes a plurality of second encoding features and the second encoding features are in a one-to-one correspondence with the second regions. Fusion processing is then performed on the first to-be-fused image and the second to-be-fused image by using a shape fusion network model to obtain a third to-be-fused image, where the third to-be-fused image includes at least one first encoding feature and at least one second encoding feature. Finally, fusion processing may be performed on the third to-be-fused image and the first to-be-fused image by using a condition fusion network model to obtain a target fused image. According to the foregoing manner, corresponding features of local regions in images are extracted. Therefore, a local region in an image may be quickly changed, that is, the local region is replaced with a corresponding local region in another image to form a fused image. In addition, the remaining regions other than edited local regions in the fused image are consistent with those in an originally inputted image, causing the user to feel that there is no change between identity information of the fused image and identity information of the originally inputted image.

Based on the embodiment corresponding to FIG. 3, in a first embodiment of the image fusion method according to an embodiment of this application, the obtaining a first feature set according to the first to-be-fused image may include:

performing encoding processing on the plurality of first regions in the first to-be-fused image by using a disentangling encoder to obtain the plurality of first encoding features, the disentangling encoder including a plurality of part-wise encoders, and each part-wise encoder being configured to encode one first region; and the obtaining a second feature set according to the second to-be-fused image includes:

performing encoding processing on the plurality of second regions in the second to-be-fused image by using the disentangling encoder to obtain the plurality of second encoding features, the disentangling encoder including the plurality of part-wise encoders, and each part-wise encoder being configured to encode one second region.

This embodiment describes a method for obtaining, by the image fusion apparatus, the first feature set and the second feature set. After obtaining the first to-be-fused image and the second to-be-fused image, the image fusion apparatus inputs the first to-be-fused image and the second to-be-fused image into a disentangling encoder respectively. The disentangling encoder includes a plurality of part-wise encoders, and a disentangled facial shape is obtained by encoding the regions in the image by using the part-wise encoders.

Figure 4:
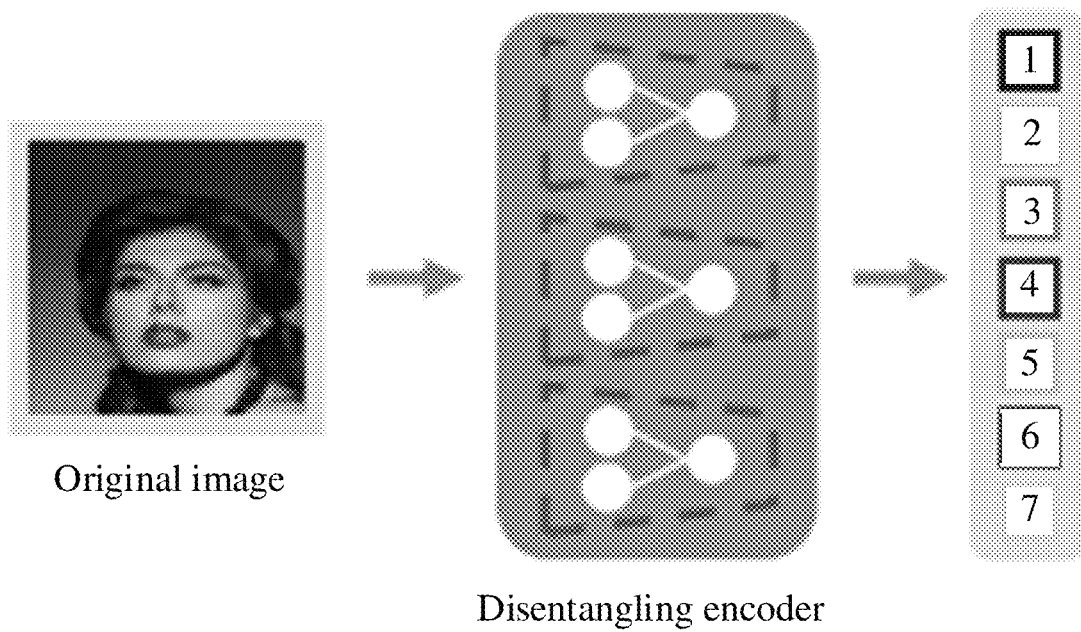
FIG. 4 is a schematic diagram of an embodiment of encoding an image by using a disentangling encoder according to an embodiment of this application.

Specifically, for ease of understanding, referring to FIG. 4, FIG. 4 is a schematic diagram of an embodiment of encoding an image by using a disentangling encoder according to an embodiment of this application. As shown in the figure, an original image is inputted into a disentangling encoder, where the original image may be a face image. The disentangling encoder includes a plurality of part-wise encoders, and each part-wise encoder is responsible for independently encoding one region in the face image. For example, a part-wise encoder No. 1 is used for encoding an eye part in the face image to obtain an encoding result No. 1. A part-wise encoder No. 2 is used for encoding a nose part in the face image to obtain an encoding result No. 2. A part-wise encoder No. 3 is used for encoding a mouth part in the face image to obtain an encoding result No. 3. A part-wise encoder No. 4 is used for encoding an eyebrow part in the face image to obtain an encoding result No. 4. A part-wise encoder No. 5 is used for encoding a facial outline in the face image to obtain an encoding result No. 5. A part-wise encoder No. 6 is used for encoding a hair part in the face image to obtain an encoding result No. 6. A part-wise encoder No. 7 is used for encoding a body part in the face image to obtain an encoding result No. 7. The encoding result No. 1 to the encoding result No. 7 are stitched together to form a face shape gene, that is, the first feature set and the second feature set are formed.

It may be understood that, the first feature set is obtained after encoding the first to-be-fused image and the second feature set is obtained after encoding the second to-be-fused image. Each first encoding feature in the first feature set and each second encoding feature in the second feature set have feature vectors with the same dimension, for example, 1*1*128 feature vectors.

An image encoding manner is also provided in an embodiment of this application. That is, the image fusion apparatus uses the disentangling encoder to perform encoding processing on the plurality of first regions in the first to-be-fused image to obtain the plurality of first encoding features, and uses the disentangling encoder to perform encoding processing on the plurality of second regions in the second to-be-fused image to obtain the plurality of second encoding features. The disentangling encoder includes a plurality of part-wise encoders, and each part-wise encoder is configured to encode one second region. According to the foregoing manner, encoding processing is performed on different regions in the image by using the part-wise encoders, which can effectively ensure the consistency of image encoding and further help to perform subsequent prediction processing.

Based on the embodiment corresponding to FIG. 3, in a second embodiment of the image fusion method according to an embodiment of this application, before the performing fusion processing on the first to-be-fused image and the second to-be-fused image by using a shape fusion network model to obtain a third to-be-fused image, the method may further include:

determining a to-be-replaced region in the first to-be-fused image, the to-be-replaced region being one region in the plurality of first regions; and obtaining a first to-be-replaced encoding feature in the first to-be-fused image according to the to-be-replaced region and obtaining a second to-be-replaced encoding feature in the second to-be-fused image according to the to-be-replaced region, the first to-be-replaced encoding feature being one encoding feature in the plurality of first encoding features, and the second to-be-replaced encoding feature being one encoding feature in the plurality of second encoding features.

This embodiment describes operations that the image fusion apparatus needs to perform before performing the image fusion processing. First, the image fusion apparatus needs to determine a to-be-replaced region in the first to-be-fused image. Using a face image as an example, the to-be-replaced region may be a hair region. The to-be-replaced region is one region in the plurality of first regions in the first to-be-fused image. Accordingly, a corresponding to-be-replaced region also exists in the second to-be-fused image. Using a face image as an example, the to-be-replaced region is also a hair region. The image fusion apparatus then obtains a first to-be-replaced encoding feature in the first to-be-fused image according to the to-be-replaced region and obtains a second to-be-replaced encoding feature in the second to-be-fused image according to the to-be-replaced region. For example, an encoding feature corresponding to the hair region in the face shape gene in the first feature set may be determined and the encoding feature corresponding to the hair region is the first to-be-replaced encoding feature; and an encoding feature corresponding to the hair region in the face shape gene in the second feature set is determined and the encoding feature corresponding to the hair region is the second to-be-replaced encoding feature.

A processing manner before image fusion is also described in an embodiment of this application. Before obtaining the third to-be-fused image, the image fusion apparatus needs to first determine a to-be-replaced region in the first to-be-fused image, where the to-be-replaced region is one region in the plurality of first regions, then obtain a first to-be-replaced encoding feature in the first to-be-fused image according to the to-be-replaced region, and obtain a second to-be-replaced encoding feature in the second to-be-fused image according to the to-be-replaced region. According to the foregoing manner, to-be-replaced regions may be determined as required, and different encoding features of the same region in two images are replaced then to quickly generate a fused image, which helps to perform subsequent processing.

Based on the second embodiment corresponding to FIG. 3, in a third embodiment of the image fusion method according to an embodiment of this application, the performing fusion processing on the first to-be-fused image and the second to-be-fused image by using a shape fusion network model to obtain a third to-be-fused image may include:

replacing the first to-be-replaced encoding feature in the first to-be-fused image with the second to-be-replaced encoding feature in the second to-be-fused image by using the shape fusion network model to obtain a to-be-decoded image; and performing decoding processing on the to-be-decoded image by using the shape fusion network model to obtain the third to-be-fused image.

This embodiment describes a manner in which the image fusion apparatus obtains the third to-be-fused image by using the shape fusion network model. The image fusion apparatus first needs to replace the first to-be-replaced encoding feature in the first to-be-fused image with the second to-be-replaced encoding feature in the second to-be-fused image by using the shape fusion network model to obtain a to-be-decoded image, and then performs decoding processing on the to-be-decoded image by using an overall decoder to obtain the third to-be-fused image.

Figure 5:
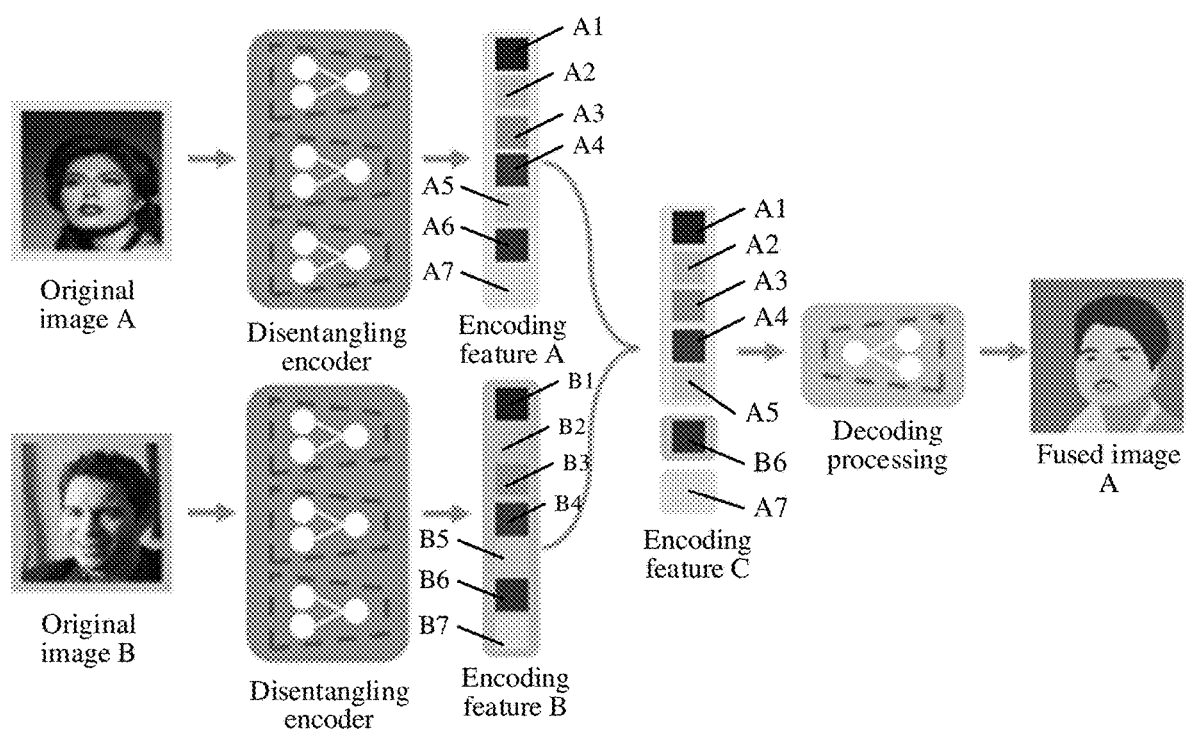
FIG. 5 is a schematic diagram of an embodiment of fusing images by using a shape fusion network model according to an embodiment of this application.

For ease of understanding, referring to FIG. 5, FIG. 5 is a schematic diagram of an embodiment of fusing images by using a shape fusion network model according to an embodiment of this application. As shown in the figure, assuming that the first to-be-fused image is an original image A and the second to-be-fused image is an original image B, the original image A and the original image B are respectively inputted into a disentangling encoder, and the disentangling encoder outputs a first feature set corresponding to the original image A, where the first feature set includes an encoding feature A, and the encoding feature A is specifically represented as A1, A2, A3, A4, A5, A6, and A7. Similarly, the disentangling encoder outputs a second feature set corresponding to the original image B, where the second feature set includes an encoding feature B, and the encoding feature B is specifically represented as B1, B2, B3, B4, B5, B6, and B7. If the to-be-replaced region is a hair region, for the first feature set, the first to-be-replaced encoding feature is a feature A6 corresponding to the hair region. Accordingly, for the second feature set, the second to-be-replaced encoding feature is a feature B6 corresponding to the hair region. Next, A6 in the first feature set needs to be replaced with the feature B6 to form a new feature set, where the feature set includes an encoding feature C, and the encoding feature C is specifically A1, A2, A3, A4, A5, B6, and A7. Finally, the overall decoder in the shape fusion network model performs decoding processing on the encoding feature C to form a fused image A, that is, obtain the third to-be-fused image.

As can be seen from the foregoing description, if a hair style of a receptor image needs to be replaced with a hair style of a donor image, the shape fusion network model may replace a feature of a hair style region corresponding to a face shape gene of the receptor image with a feature of a hair style region corresponding to a face shape gene of the donor image to obtain a modified mixed face shape gene, and finally the mixed face shape gene is decoded into an edited face image by using the overall decoder.

A specific structure of the overall decoder may be represented as:

u5-512, u5-256, R256, R256, R256, R256, R256, u5-128, u5-64, c7s1-3.

u5-512 represents a fractional-strided convolution instance norm-ReLU layer that includes 512 5×5 convolution kernels and of which a stride is ½. u5-256 represents a fractional-strided convolution instance norm-ReLU layer that includes 256 5×5 convolution kernels and of which a stride is ½. R256 represents a fractional-strided convolution instance norm-ReLU layer of a residual block that includes two 3×3 convolutional layers, where each convolutional layer has 256 convolution kernels. u5-128 represents a fractional-strided convolution instance norm-ReLU layer that includes 128 5×5 convolution kernels and of which a stride is ½. u5-64 represents a fractional-strided convolution instance norm-ReLU layer that includes 64 5×5 convolution kernels and of which a stride is ½. c7s1-3 represents a convolution-instance norm ReLU layer that includes three 7×7 convolution kernels and of which a stride is 1.

The specific structure of the overall decoder may be alternatively represented in another form, and the foregoing description is merely an example and is not to be understood as a limitation on this application.

Besides, a specific manner in which the third to-be-fused image is generated is described in an embodiment of this application. The image fusion apparatus first replaces the first to-be-replaced encoding feature in the first to-be-fused image with the second to-be-replaced encoding feature in the second to-be-fused image by using the shape fusion network model to obtain a to-be-decoded image, and then performs decoding processing on the to-be-decoded image by using the shape fusion network model again to obtain the third to-be-fused image. According to the foregoing manner, the two images may be fused quickly by using the shape fusion network model, and image fusion efficiency may be effectively improved. Besides, for the originally inputted face image, the remaining parts other than the edited parts in a generated virtual face are consistent with those in the originally inputted face image, causing the user to feel that there is no change between identity information of the generated virtual face and identity information of the originally inputted face, thereby implementing an operation of ensuring identity consistency.

Based on the second embodiment or the third embodiment corresponding to FIG. 3, in a fourth embodiment of the image fusion method according to an embodiment of this application, after the performing fusion processing on the first to-be-fused image and the second to-be-fused image by using a shape fusion network model to obtain a third to-be-fused image, the method may further include:

receiving a region adjustment instruction through the third to-be-fused image, the region adjustment instruction being used for adjusting a shape of at least one region in the image; in one implementation, the image referring to the third to-be-fused image;

adjusting the to-be-replaced region in response to the region adjustment instruction, to obtain a target replaced region corresponding to the to-be-replaced region; and processing the third to-be-fused image according to the target replaced region to obtain a fourth to-be-fused image; and the performing fusion processing on the third to-be-fused image and the first to-be-fused image by using a condition fusion network model to obtain a target fused image may include:

performing fusion processing on the fourth to-be-fused image and the first to-be-fused image by using the condition fusion network model to obtain the target fused image.

This embodiment describes a method for adjusting the to-be-replaced region to generate a fused image. First, after the image fusion apparatus generates the third to-be-fused image, the third to-be-fused image may be displayed on a display interface of the terminal device. The user triggers a region adjustment instruction through a trigger operation, that is, a shape and a size of a region in the third to-be-fused image may be adjusted according to the region adjustment instruction. The image fusion apparatus adjusts the to-be-replaced region according to the region adjustment instruction triggered by the user to obtain an adjusted target replaced region and then processes the third to-be-fused image according to the target replaced region to obtain a fourth to-be-fused image. Finally, the image fusion apparatus performs fusion processing on the fourth to-be-fused image and the first to-be-fused image by using a condition fusion network model to obtain the target fused image.

Figure 6:
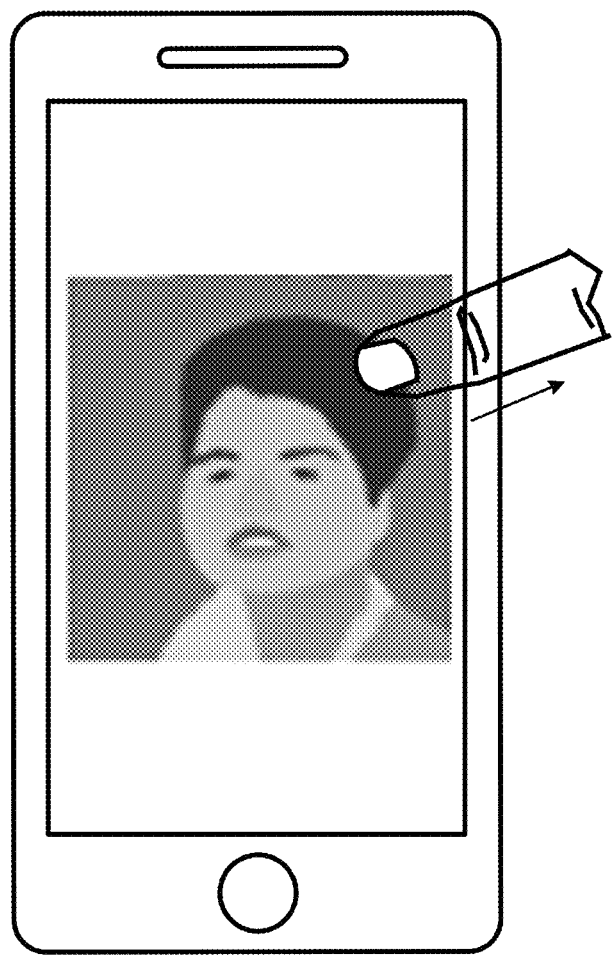
FIG. 6 is a schematic diagram of an embodiment of drawing a shape by hands according to an embodiment of this application.

For ease of understanding, referring to FIG. 6, FIG. 6 is a schematic diagram of an embodiment of drawing a shape by hands according to an embodiment of this application. As shown in the figure, when the display interface of the terminal device displays the third to-be-fused image, the user may directly drag a finger of the user to drag one region on the interface to adjust the shape and size of the region. In one implementation, the user may select a specific region, and adjust the size/shape of the specific region without changing the size/shape of other un-selected regions.

For example, the user may press a hair region and drag the hair region outward to form an adjusted head portrait region, that is, obtain the target replaced region. In this process, the user may arbitrarily edit the shape of the region as required to generate a virtual face image. In an actual application, the user may alternatively edit a plurality of different regions to improve the virtual face image.

Further, in an embodiment of this application, a method for adjusting the third to-be-fused image by the user is provided. That is, after obtaining the third to-be-fused image, the image fusion apparatus receives a region adjustment instruction through the third to-be-fused image, adjusts the to-be-replaced region in response to the region adjustment instruction to obtain a target replaced region corresponding to the to-be-replaced region, then processes the third to-be-fused image according to the target replaced region to obtain a fourth to-be-fused image, and finally performs fusion processing on the fourth to-be-fused image and the first to-be-fused image by using the condition fusion network model to obtain the target fused image. According to the foregoing manner, the user may further adjust the shape and size of the to-be-replaced region as required in a manner that the user specifies the edited region, and may draw the shape of the region by hands to generate a new image, to improve the flexibility and practicability of the solution.

Based on FIG. 3 and any one of the first embodiment to the fourth embodiment corresponding to FIG. 3, in a fifth embodiment of the image fusion method according to an embodiment of this application, the performing fusion processing on the third to-be-fused image and the first to-be-fused image by using a condition fusion network model to obtain a target fused image may include:

performing stitching processing on the third to-be-fused image and the first to-be-fused image to obtain a multi-channel feature image, the multi-channel feature image being used for stitching color features of at least two images; and obtaining the target fused image corresponding to the multi-channel feature image by using the condition fusion network model. In one implementation, the at least two images may include the third to-be-fused image and the first to-be-fused image. In another implementation, the at least two images may include the first to-be-fused image and the second to-be-fused image.

This embodiment describes a method for obtaining the target fused image by using the condition fusion network model. The image fusion apparatus first performs stitching processing on the third to-be-fused image and the first to-be-fused image to obtain a multi-channel feature image. For example, the first to-be-fused image includes three channels which are specifically a red (R) channel, a green (G) channel, and a blue (B) channel, and the third to-be-fused image also includes three channels which are specifically an R channel, a G channel, and a B channel. The three channels of the first to-be-fused image and the three channels of the third to-be-fused image are stitched to obtain a multi-channel feature image including six channels. Finally, the multi-channel feature image is inputted into a condition fusion network model, and the condition fusion network model outputs a corresponding target fused image.

Specifically, the condition fusion network model may convert the edited third to-be-fused image into a realistic target fused image and ensure that there is no change between an identity of the generated target fused image and an identity of the first to-be-fused image. The condition fusion network model uses the edited third to-be-fused image as an input and uses the first to-be-fused image as a condition input. The first to-be-fused image and the third to-be-fused image are stitched to form a multi-channel feature image, and then the multi-channel feature image is inputted into the condition fusion network model. In an actual application, the first to-be-fused image may obtain, by using a part-wise decoder, an image from which a to-be-replaced region is removed. If the third to-be-fused image is an image manually adjusted by the user, the third to-be-fused image is the fourth to-be-fused image. That is to say, stitching processing may be performed on the fourth to-be-fused image and the first to-be-fused image to obtain the multi-channel feature image.

A specific structure of the condition fusion network model may be represented as:

c7s1-64, c3s2-128, c3s2-256, c3s2-512, c3s2-1024, R1024, R1024, R1024, R1024, R1024, R1024, R1024, R1024, R1024, u3-512, u3-256, u3-128, u3-64, c7s1-3.

c7s1-64 represents a convolution-instance norm ReLU layer that includes 64 7×7 convolution kernels and of which a stride is 1. c3s2-128 represents a convolution-instance norm ReLU layer that includes 128 3×3 convolution kernels and of which a stride is 2. c3s2-256 represents a convolution-instance norm ReLU layer that includes 256 3×3 convolution kernels and of which a stride is 2. c3s2-512 represents a convolution-instance norm ReLU layer that includes 512 3×3 convolution kernels and of which a stride is 2. c3s2-1024 represents a convolution-instance norm ReLU layer that includes 1024 3×3 convolution kernels and of which a stride is 2. R1024 represents a fractional-strided convolution instance norm-ReLU layer of a residual block that includes two 3×3 convolutional layers, where each convolutional layer has 1024 convolution kernels. u3-512 represents a fractional-strided convolution instance norm-ReLU layer that includes 512 3×3 convolution kernels and of which a stride is ½. u3-256 represents a fractional-strided convolution instance norm-ReLU layer that includes 256 3×3 convolution kernels and of which a stride is ½. u3-128 represents a fractional-strided convolution instance norm-ReLU layer that includes 128 3×3 convolution kernels and of which a stride is ½. u3-64 represents a fractional-strided convolution instance norm-ReLU layer that includes 64 3×3 convolution kernels and of which a stride is ½. c7s1-3 represents a convolution-instance norm ReLU layer that includes three 7×7 convolution kernels and of which a stride is 1.

The specific structure of the condition fusion network model may be alternatively represented in another form, and the foregoing description is merely an example and is not to be understood as a limitation on this application.

Still further, in an embodiment of this application, a method for obtaining the target fused image is provided. That is, the image fusion apparatus first performs stitching processing on the third to-be-fused image and the first to-be-fused image to obtain a multi-channel feature image, where the multi-channel feature image is used for stitching color features of the at least two images, and then obtains the target fused image corresponding to the multi-channel feature image by using the condition fusion network model. According to the foregoing manner, the two images may be stitched accurately by using the condition fusion network model to implement fusion of images, thereby improving the feasibility and operability of the solution.

Figure 7:
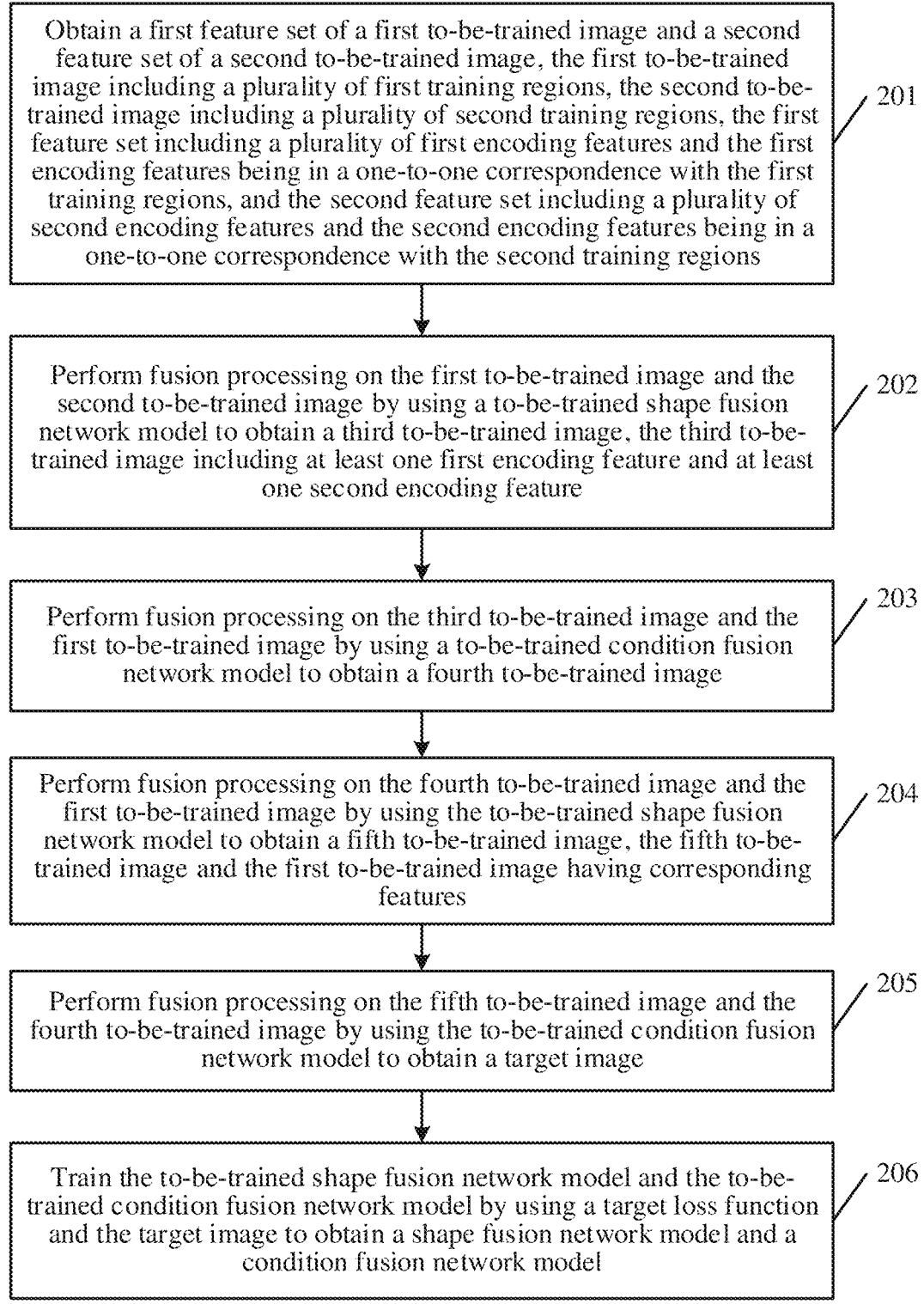
FIG. 7 is a schematic diagram of an embodiment of a model training method according to an embodiment of this application.

The following describes a model training method in this application with reference to the foregoing description. Referring to FIG. 7, one embodiment of the model training method performed by a server device shown in FIG. 17 according to an embodiment of this application includes:

201. Obtain a first feature set of a first to-be-trained image and a second feature set of a second to-be-trained image, the first to-be-trained image including a plurality of first training regions, the second to-be-trained image including a plurality of second training regions, the first feature set including a plurality of first encoding features and the first encoding features being in a one-to-one correspondence with the first training regions, and the second feature set including a plurality of second encoding features and the second encoding features being in a one-to-one correspondence with the second training regions.

In this embodiment, a model training apparatus obtains a first to-be-trained image and a second to-be-trained image. The first to-be-trained image and the second to-be-trained image are generally images of the same type. For example, both of the two images are face images, both of the two images are animal images, both of the two images are landscape images, or one of the two images is a face image and the other is an animal image. Description is made by using an example in which both of the two images are face images in this embodiment. However, this is not to be understood as a limitation on this application.

Both the first to-be-trained image and the second to-be-trained image include a plurality of regions. Specifically, the first to-be-trained image and the second to-be-trained image have similar regions. For example, the first to-be-trained image includes a plurality of first regions, and the first regions include eyes, a nose, a mouth, eyebrows, a face, hair, a body, and the like. The second to-be-trained image includes a plurality of second regions, and the second regions include eyes, a nose, a mouth, eyebrows, a face, hair, a body, and the like.

The model training apparatus needs to perform feature extraction on the first to-be-trained image and the second to-be-trained image respectively, that is, extracts corresponding features of the first regions in the first to-be-trained image to obtain the first encoding features. For example, a first encoding feature of an eye part may be extracted for the eye part of the first to-be-trained image, a first encoding feature of a hair part may be extracted for the hair part of the first to-be-trained image, and by analogy, a first feature set including a plurality of first encoding features is finally obtained. A second encoding feature of an eye part may be extracted for the eye part of the second to-be-trained image, a second encoding feature of a hair part may be extracted for the hair part of the second to-be-trained image, and by analogy, a second feature set including a plurality of second encoding features is finally obtained.

202. Perform fusion processing on the first to-be-trained image and the second to-be-trained image by using a to-be-trained shape fusion network model to obtain a third to-be-trained image, the third to-be-trained image including at least one first encoding feature and at least one second encoding feature.

In this embodiment, the model training apparatus inputs the first to-be-trained image and the second to-be-trained image into a to-be-trained shape fusion network model, and the to-be-trained shape fusion network model outputs a third to-be-trained image. The third to-be-trained image herein includes both the first encoding features in the first to-be-trained image and the second encoding features in the second to-be-trained image.

203. Perform fusion processing on the third to-be-trained image and the first to-be-trained image by using a to-be-trained condition fusion network model to obtain a fourth to-be-trained image.

In this embodiment, the model training apparatus inputs the third to-be-trained image and the first to-be-trained image into a to-be-trained condition fusion network model, and the to-be-trained condition fusion network model outputs a fourth to-be-trained image. The fourth to-be-trained image and the originally inputted first to-be-trained image belong to the same identity. That is, the remaining parts other than edited parts in a generated virtual image are consistent with those in the originally inputted face image, causing the user to feel that there is no change between identity information of the generated virtual face image and identity information of the originally inputted face image.

204. Perform fusion processing on the fourth to-be-trained image and the first to-be-trained image by using the to-be-trained shape fusion network model to obtain a fifth to-be-trained image, the fifth to-be-trained image and the first to-be-trained image having corresponding features.

In this embodiment, after the model training apparatus inputs the fourth to-be-trained image and the first to-be-trained image into the to-be-trained shape fusion network model, the to-be-trained shape fusion network model outputs a fifth to-be-trained image. The fifth to-be-trained image and the originally inputted first to-be-trained image belong to the same identity. That is, the remaining parts other than edited parts in a generated virtual image are consistent with those in the originally inputted face image, causing the user to feel that there is no change between identity information of the generated virtual face image and identity information of the originally inputted face image.

205. Perform fusion processing on the fifth to-be-trained image and the fourth to-be-trained image by using the to-be-trained condition fusion network model to obtain a target image.

In this embodiment, the model training apparatus inputs the fifth to-be-trained image and the fourth to-be-trained image into a to-be-trained condition fusion network model, and the to-be-trained condition fusion network model outputs a target image. The target image and the originally inputted first to-be-trained image belong to the same identity. That is, the remaining parts other than edited parts in a generated virtual image are consistent with those in the originally inputted face image, causing the user to feel that there is no change between identity information of the generated virtual face image and identity information of the originally inputted face image.

206. Train the to-be-trained shape fusion network model and the to-be-trained condition fusion network model by using a target loss function and the target image to obtain a shape fusion network model and a condition fusion network model.

In this embodiment, the model training apparatus trains the to-be-trained shape fusion network model and the to-be-trained condition fusion network model by using the target loss function, the first to-be-trained image, the second to-be-trained image, the third to-be-trained image, the fourth to-be-trained image, the fifth to-be-trained image, and the target image, to obtain a shape fusion network model and a condition fusion network model.

Figure 8:
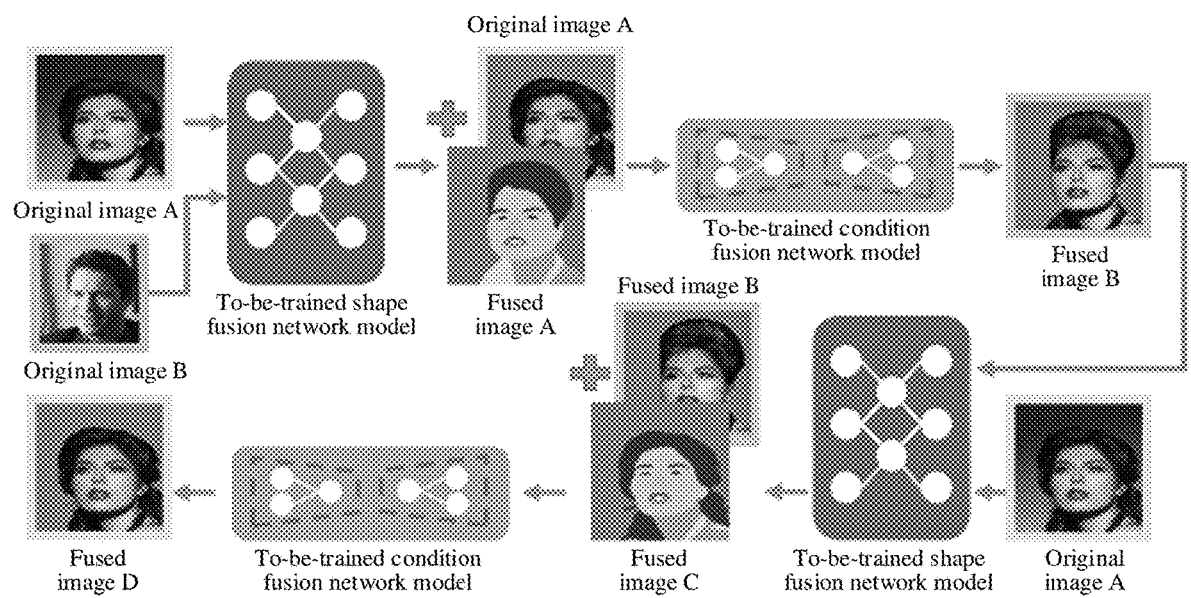
FIG. 8 is a schematic diagram of an embodiment of training a condition fusion network model according to an embodiment of this application.

For ease of understanding, referring to FIG. 8, FIG. 8 is a schematic diagram of an embodiment of training a condition fusion network model according to an embodiment of this application. As shown in the figure, a to-be-trained shape fusion network model uses an original image A (that is, the first to-be-trained image) being a receptor image and an original image B (that is, the second to-be-trained image) being a donor image as inputs, to generate an edited fused image A (that is, the third to-be-trained image). A to-be-trained condition fusion network model may obtain an edited fused image B (that is, the fourth to-be-trained image) by using the fused image A as an input and the original image A as a condition input. Next, the fused image B is used as a receptor image (that is, replacing the original image A), and the original image A is used as a donor image (that is, replacing the original image B), to restore the original part shape of the original image A through replacement. The to-be-trained shape fusion network model uses the fused image B being the receptor image and the original image A being the donor image as inputs to generate an edited fused image C (that is, the fifth to-be-trained image). The to-be-trained condition fusion network model may obtain an edited fused image D (that is, the target image) by using the fused image C as an input and the fused image B as a condition input. A constraint target of cyclic training is to expect that the target image and the first to-be-trained image are as similar as possible, and the fifth to-be-trained image and an actual image are as similar as possible. In one implementation, the actual image indicates a feature image corresponding to the first to-be-trained image. In another implementation, the actual image may be at least one of the original image A, the first to-be-trained image, or the receptor image.

In an embodiment of this application, a model training method is provided. The model training apparatus first obtains a first feature set of a first to-be-trained image and a second feature set of a second to-be-trained image; then performs fusion processing on the first to-be-trained image and the second to-be-trained image by using a to-be-trained shape fusion network model to obtain a third to-be-trained image; then performs fusion processing on the third to-be-trained image and the first to-be-trained image by using a to-be-trained condition fusion network model to obtain a fourth to-be-trained image; then performs fusion processing on the fourth to-be-trained image and the first to-be-trained image by using the to-be-trained shape fusion network model to obtain a fifth to-be-trained image; performs fusion processing on the fifth to-be-trained image and the fourth to-be-trained image by using the to-be-trained condition fusion network model to obtain a target image; and finally trains the to-be-trained shape fusion network model and the to-be-trained condition fusion network model by using a target loss function and the target image to obtain a shape fusion network model and a condition fusion network model. According to the foregoing manner, models may be trained while ensuring the consistency between identity information of a fused image and identity information of an originally inputted image, thereby improving the reliability of model training.

Based on the embodiment corresponding to FIG. 7, in a first embodiment of the model training method according to an embodiment of this application, before the obtaining a first feature set of a first to-be-trained image and a second feature set of a second to-be-trained image, the method may further include:

obtaining a to-be-trained target image set, the to-be-trained target image set including at least one to-be-trained target image, and each to-be-trained target image including at least one region;

performing encoding processing on each region of the to-be-trained target image in the to-be-trained target image set by using a to-be-trained disentangling encoder to obtain an encoding result, the to-be-trained disentangling encoder including a plurality of to-be-trained part-wise encoders, and each to-be-trained part-wise encoder being configured to encode one region;

performing decoding processing on the encoding result by using a to-be-trained disentangling decoder to obtain a decoding result, the to-be-trained disentangling decoder including a plurality of to-be-trained part-wise decoders, and each to-be-trained part-wise decoder being configured to decode one region; and training the to-be-trained disentangling encoder by using a loss function and the decoding result to obtain a disentangling encoder, the disentangling encoder including a plurality of part-wise encoders; and the obtaining a first feature set of a first to-be-trained image and a second feature set of a second to-be-trained image may include:

obtaining the first to-be-trained image and the second to-be-trained image;

performing encoding processing on the plurality of first regions in the first to-be-trained image by using the disentangling encoder to obtain the plurality of first encoding features, each part-wise encoder being configured to encode one first region; and performing encoding processing on the plurality of second regions in the second to-be-trained image by using the disentangling encoder to obtain the plurality of second encoding features, each part-wise encoder being configured to encode one second region.

In this embodiment, a method for obtaining a disentangling encoder through training is described. That is, the model training apparatus first needs to obtain a to-be-trained target image set, where the to-be-trained target image set includes at least one to-be-trained target image, and each to-be-trained target image includes at least one region. Then encoding processing may be performed on each region of the to-be-trained target image in the to-be-trained target image set by using a to-be-trained disentangling encoder to obtain an encoding result. The to-be-trained disentangling encoder includes a plurality of to-be-trained part-wise encoders, and each to-be-trained part-wise encoder is configured to encode one region. For example, a region encoded by a part-wise encoder No. 1 is a nose region, and a region encoded by a part-wise encoder No. 2 is a hair region. Accordingly, the model training apparatus sets a corresponding to-be-trained disentangling decoder for the to-be-trained disentangling encoder, where the to-be-trained disentangling decoder includes a plurality of to-be-trained part-wise decoders, and each to-be-trained part-wise decoder is configured to decode one region. Similarly, for example, a region decoded by a part-wise decoder No. 1 is the nose region, and a region decoded by a second part-wise decoder No. 2 is the hair region. The to-be-trained disentangling encoder is trained by using a loss function in combination with a decoding result of each pair of part-wise encoder and part-wise decoder to obtain a disentangling encoder. Specifically, part-wise encoders in the disentangling encoder may be obtained.

Figure 9:
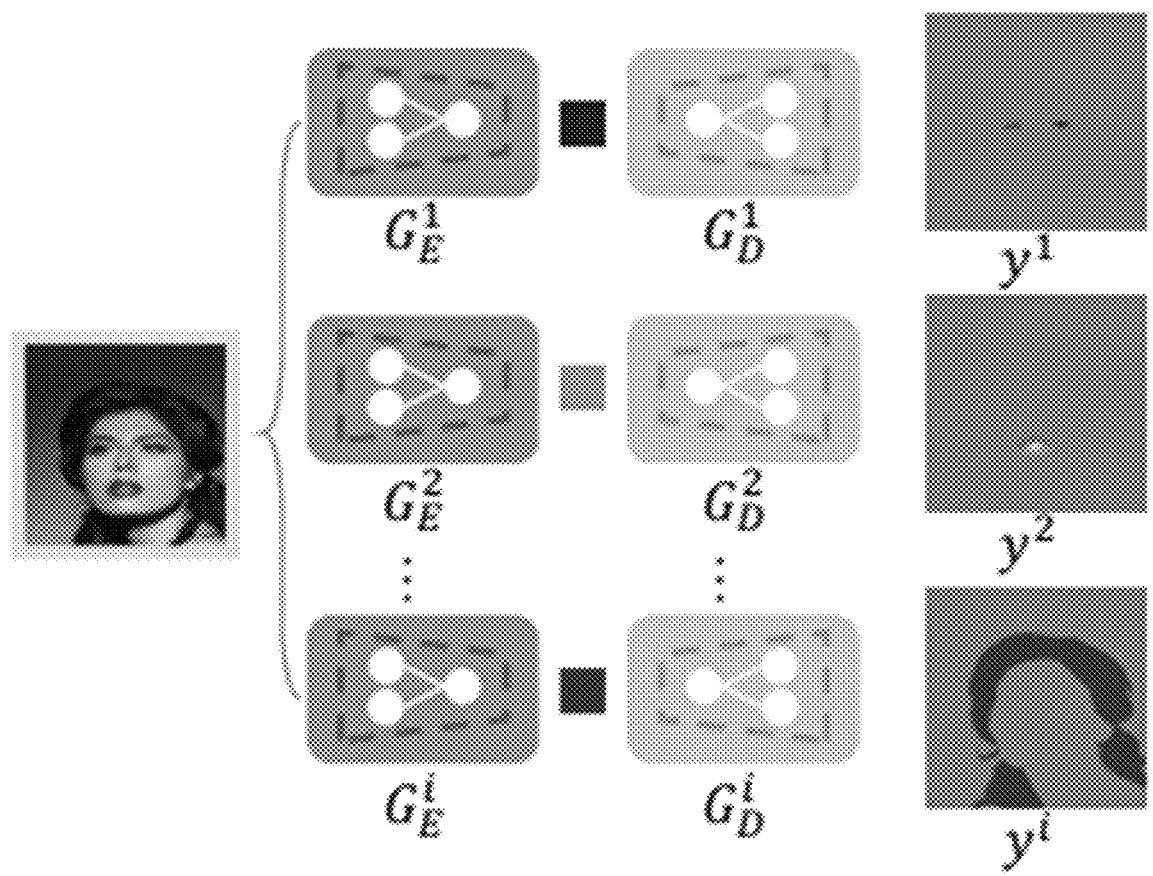
FIG. 9 is a schematic diagram of an embodiment of training a disentangling encoder according to an embodiment of this application.

For ease of understanding, referring to FIG. 9, FIG. 9 is a schematic diagram of an embodiment of training a disentangling encoder according to an embodiment of this application. As shown in the figure, this application uses a convolutional neural network-based encoder to perform disentangling feature extraction on an inputted image. The disentangling encoder of this application includes a plurality of part-wise encoders, where each part-wise encoder independently encodes a shape of a specified part in a face image. A part-wise encoder inputs a face image, and a 1*1*128 one-dimensional feature vector may be outputted, thereby encoding the shape of a specific part of the face image. Parts considered in this application include, but are not limited to, eyes, a nose, a mouth, eyebrows, a face, hair, and a body. Feature vectors of all parts are stitched together to form a feature set which may be referred to as a face shape gene.

In a training stage, a corresponding part-wise decoder is configured for each part-wise encoder. For example, a corresponding part-wise decoder $G_D^1$ is configured for a part-wise encoder $G_E^1$, and the part-wise decoder is configured to learn a generated image of a corresponding facial part from a feature vector outputted by the part-wise encoder, for example, to obtain an image $y^1$. The part-wise encoder and the part-wise decoder are trained together in pairs. Under supervision of the part-wise decoder, the part-wise encoder automatically discards shape information of parts that do not need to be encoded, and reserves, in the outputted feature vector, shape information of only parts that need to be encoded.

A specific structure of the part-wise encoder may be represented as:
  c7s1-64, c5s4-128, c5s4-256, R256, R256, R256, R256, c5s4-512, c5s4-128.

c7s1-64 represents a convolution-instance norm ReLU layer that includes 64 7×7 convolution kernels and of which a stride is 1. c5s4-128 represents a convolution-instance norm ReLU layer that includes 128 5×5 convolution kernels and of which a stride is 4. c5s4-256 represents a convolution-instance norm ReLU layer that includes 256 5×5 convolution kernels and of which a stride is 4. R256 represents a fractional-strided convolution instance norm-ReLU layer of a residual block that includes two 3×3 convolutional layers, where each convolutional layer has 256 convolution kernels. c5s4-512 represents a convolution-instance norm ReLU layer that includes 512 5×5 convolution kernels and of which a stride is 4. c5s4-128 represents a convolution-instance norm ReLU layer that includes 128 5×5 convolution kernels and of which a stride is 4.

The specific structure of the part-wise encoder may be alternatively represented in another form, and the foregoing description is merely an example and is not to be understood as a limitation on this application.

A specific structure of the part-wise decoder is:
  u5-512, u5-256, R256, R256, R256, R256, R256, u5-128, u5-64, c7s1-3.

u5-512 represents a fractional-strided convolution instance norm-ReLU layer that includes 512 5×5 convolution kernels and of which a stride is ½. u5-256 represents a fractional-strided convolution instance norm-ReLU layer that includes 256 5×5 convolution kernels and of which a stride is ½. R256 represents a fractional-strided convolution instance norm-ReLU layer of a residual block that includes two 3×3 convolutional layers, where each convolutional layer has 256 convolution kernels. u5-128 represents a fractional-strided convolution instance norm-ReLU layer that includes 128 5×5 convolution kernels and of which a stride is ½. u5-64 represents a fractional-strided convolution instance norm-ReLU layer that includes 64 5×5 convolution kernels and of which a stride is ½. c7s1-3 represents a convolution-instance norm ReLU layer that includes three 7×7 convolution kernels and of which a stride is 1.

The specific structure of the part-wise decoder may be alternatively represented in another form, and the foregoing description is merely an example and is not to be understood as a limitation on this application.

In an embodiment of this application, a specific method for obtaining a disentangling encoder through training is also described. That is, the model training apparatus may first obtain a to-be-trained target image set, then perform encoding processing on each region in a to-be-trained target image in the to-be-trained target image set by using a to-be-trained disentangling encoder to obtain an encoding result, then perform decoding processing on the encoding result by using a to-be-trained disentangling decoder to obtain a decoding result, and train the to-be-trained disentangling encoder by using a loss function and the decoding result to obtain a disentangling encoder. According to the foregoing manner, in a model training stage, a corresponding to-be-trained disentangling decoder is configured for the to-be-trained disentangling encoder, and the to-be-trained disentangling decoder is configured to learn a generated shape image of a corresponding region from a feature vector outputted by the to-be-trained disentangling encoder, thereby improving the accuracy and reliability of image encoding.

Based on the embodiment corresponding to FIG. 7, in a second embodiment of the model training method according to an embodiment of this application, before the training the to-be-trained shape fusion network model and the to-be-trained condition fusion network model by using a target loss function and the target image to obtain a shape fusion network model and a condition fusion network model, the method may further include:
  determining a first loss function according to the fifth to-be-trained image and an actual image;
  determining a second loss function according to the target image and the first to-be-trained image;

determining a third loss function according to the first to-be-trained image, the second to-be-trained image, the fourth to-be-trained image, and the target image; and determining the target loss function according to the first loss function, the second loss function, and the third loss function.

This embodiment describes a manner in which the model training apparatus determines the target loss function. A constraint target of cyclic training is to expect that the target image and the first to-be-trained image are as similar as possible, and the fifth to-be-trained image and an actual image are as similar as possible. Therefore, the first loss function is generated according to the fifth to-be-trained image and an actual image, where the actual image indicates a feature image corresponding to the first to-be-trained image. The second loss function is generated according to the target image and the first to-be-trained image. In addition to ensuring that identity information of a person is not lost by using two cyclic constraints such as a label map and an image appearance, an adversarial constraint may be further used to require that a result generated by the model looks like an image of a real face, that is, to determine the third loss function according to the first to-be-trained image, the second to-be-trained image, the fourth to-be-trained image, and the target image. The target loss function is obtained by adding the first loss function, the second loss function, and the third loss function together.

In an embodiment of this application, a method for obtaining a target loss function is also provided. That is, before obtaining the shape fusion network model and the condition fusion network model, the model training apparatus needs to first determine a first loss function according to the fifth to-be-trained image and an actual image, then determine a second loss function according to the target image and the first to-be-trained image, then determine a third loss function according to the first to-be-trained image, the second to-be-trained image, the fourth to-be-trained image, and the target image, and finally determine the target loss function according to the first loss function, the second loss function, and the third loss function. According to the foregoing manner, a reliable manner is provided for implementation of the solution. The final loss function is generated with reference to a plurality of images, and importance of the images in the model training process is considered, thereby obtaining a more accurate model.

Based on the second embodiment corresponding to FIG. 7, in a third embodiment of the model training method according to an embodiment of this application, the determining, by the model training apparatus, a first loss function according to the fifth to-be-trained image and an actual image may include:

calculating the first loss function in the following manner:

$$L_{cyc,L} = E_{y'_r y_A}[\|y'_r - y_A\|_1 + \lambda_{VGG}\|\phi(y'_r) - \phi(y_A)\|_1],$$

where $L_{cyc,L}$ represents the first loss function, E represents expected value calculation, $y'_r$ represents the fifth to-be-trained image, $y_A$ represents the actual image, $\lambda_{VGG}$ represents a loss proportion adjustment coefficient, and $\phi(\ )$ represents a feature outputted by a pre-trained network model;

determining, by the model training apparatus, a second loss function according to the target image and the first to-be-trained image may include:

calculating the second loss function in the following manner:

$$L_{cyc,I} = E_{x'_A x_A}[\|x'_A - x_A\|_1 + \lambda_{VGG}\|\phi(x'_A) - \phi(x_A)\|_1],$$

where $L_{cyc,I}$ represents the second loss function, $x'_A$ represents the target image, and $x_A$ represents the first to-be-trained image;

the determining, by the model training apparatus, a third loss function according to the first to-be-trained image, the second to-be-trained image, the fourth to-be-trained image, and the target image may include:

calculating the third loss function in the following manner:

$$L_{GAN} = E_{x_A x_B x_r x'_A}[\|D_I(x_A)\|_2^2 + \|D_I(x_B)\|_2^2 + \|1 - D_I(x_r)\|_2^2 + \|1 - D_I(x'_A)\|_2^2]$$

where $L_{GAN}$ represents the third loss function, $D_I$ represents a discriminative network, $x_B$ represents the second to-be-trained image, $x_r$ represents the fourth to-be-trained image, and $x'_A$ represents the target image; and the determining the target loss function according to the first loss function, the second loss function, and the third loss function may include:

calculating the target loss function in the following manner:

$L_{total} = L_{cyc,L} + L_{cyc,I} + L_{GAN}$, where $L_{total}$ represents the target loss function.

This embodiment describes a specific method for calculating a target loss function. The first loss function may be determined through the following cyclic constraint:

$$L_{cyc,L} = E_{y'_r y_A}[\|y'_r - y_A\|_1 + \lambda_{VGG}\|\phi(y'_r) - \phi(y_A)\|_1],$$

where $L_{cyc,L}$ represents the first loss function, E represents expected value calculation, $y'_r$ represents the fifth to-be-trained image, $y_A$ represents the actual image, $\lambda_{VGG}$ represents a loss proportion adjustment coefficient, and $\phi(\ )$ represents a feature outputted by a pre-trained network model. The second loss function may be determined through the following cyclic constraint:

$$L_{cyc,I} = E_{x'_A x_A}[\|x'_A - x_A\|_1 + \lambda_{VGG}\|\phi(x'_A) - \phi(x_A)\|_1],$$

where $L_{cyc,I}$ represents the second loss function, $x'_A$ represents the target image, and $x_A$ represents the first to-be-trained image. It may be understood that, both of the foregoing two formulas use two types of loss, namely, L1 loss and VGG loss. Specifically, the L1 loss is $\|y'_r - y_A\|_1$ and $\|x'_A - x_A\|_1$, and the VGG loss is $\|\phi(y'_r) - \phi$ $(y_A)\|_1$ and $\|\phi(x'_A)-\phi(x_A)\|_1$. $\lambda_{VGG}$ represents a loss proportion adjustment coefficient and is used for adjusting a proportion of the L1 loss to the VGG loss. In this application, a value of the proportion may be 1.0, which indicates that the L1 loss and the VGG loss are equivalent. $\phi(\ )$ represents a feature outputted by a pre-trained network model and specifically refers to a feature outputted by a pre-trained VGG19 network. In this application, features of a convolutional (conv) layer 1-1, a conv layer 2-2, a conv layer 3-2, a conv layer 4-4, and a conv layer 5-4 are used, and the conv layers are provided with the following weights respectively: 1/32 (a weight of the conv layer 1-1), 1/16 (a weight of the conv layer 2-2), 1/8 (a weight of the conv layer 3-2), 1/4 (a weight of the conv layer 4-4), and 1 (a weight of the conv layer 5-4).

It may be understood that settings of the weight values are merely an example and are not to be understood as a limitation on this application.

In addition to ensuring that identity information of a person is not lost by using the foregoing two cyclic constraints, an adversarial constraint also needs to be used to require that a result generated by the condition fusion network model is closer to an image of a real face, and the third loss function may be represented as:

$$L_{GAN} = E_{x_A x_B x_r x'_A}\left[\|D_I(x_A)\|_2^2 + \|D_I(x_B)\|_2^2 + \|1 - D_I(x_r)\|_2^2 + \|1 - D_I(x'_A)\|_2^2\right]$$

where
$L_{GAN}$ represents the third loss function, $D_I$ represents a discriminative network, $x_B$ represents the second to-be-trained image, $x_r$ represents the fourth to-be-trained image, and $x'_A$ represents the target image. A specific structure of the discriminative network $D_I$ includes an encoding part and a decoding part. A structure of the encoding part may be represented as: c7s1-64, c5s4-128, c5s4-256, R256, R256, R256, R256, c5s4-512, c5s4-128. A structure of the decoding part may be represented as: u5-512, u5-256, R256, R256, R256, R256, R256, u5-128, u5-64, c7s1-3. The structure herein is merely an example and is not to be understood as a limitation on this application. The discriminative network $D_I$ is trained to determine whether an image is an actual image, and the discriminative network $D_I$ is trained together with the to-be-trained shape fusion network model and the to-be-trained condition fusion network model, to maximize the adversarial constraint, that is, the third loss function $L_{GAN}$, so that a generated image and an actual image may be distinguished as accurately as possible. However, the to-be-trained shape fusion network model and the to-be-trained condition fusion network model minimize the third loss function $L_{GAN}$, to expect to generate an image as actual as possible.

Based on this, a total target loss function used for training the to-be-trained shape fusion network model and the to-be-trained condition fusion network model is obtained:

$$L_{total} = L_{cyc,L} + L_{cyc,I} + L_{GAN}.$$

Again, a specific method for calculating a loss function is described in an embodiment of this application. According to the foregoing manner, a specific basis is provided for implementation of the solution, thereby improving the feasibility and operability of the solution.

Figure 10:
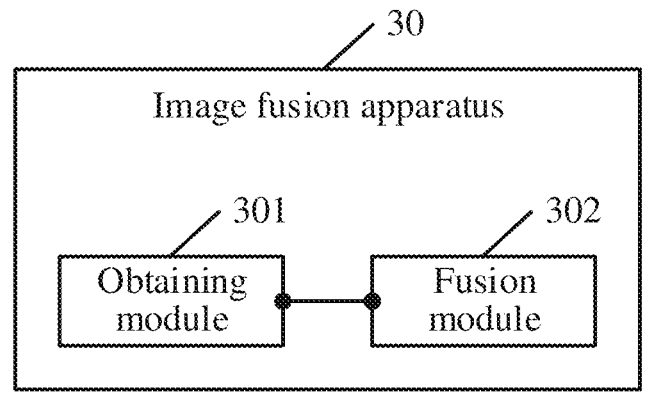
FIG. 10 is a schematic diagram of an embodiment of an image fusion apparatus according to an embodiment of this application.

An image fusion apparatus in this application is described below in detail. Referring to FIG. 10, FIG. 10 is a schematic diagram of an embodiment of an image fusion apparatus according to an embodiment of this application, and the image fusion apparatus 30 includes:
an obtaining module 301, configured to obtain a first to-be-fused image and a second to-be-fused image, the first to-be-fused image including a plurality of first regions, and the second to-be-fused image including a plurality of second regions; and
the obtaining module 301 being further configured to obtain a first feature set according to the first to-be-fused image and obtain a second feature set according to the second to-be-fused image, the first feature set including a plurality of first encoding features and the first encoding features being in a one-to-one correspondence with the first regions, and the second feature set including a plurality of second encoding features and the second encoding features being in a one-to-one correspondence with the second regions; and
a fusion module 302, configured to perform, by using a shape fusion network model, fusion processing on the first to-be-fused image and the second to-be-fused image that are obtained by the obtaining module 301 to obtain a third to-be-fused image, the third to-be-fused image including at least one first encoding feature and at least one second encoding feature that are obtained by the obtaining module 301; and
the fusion module 302 being further configured to perform fusion processing on the third to-be-fused image and the first to-be-fused image by using a condition fusion network model to obtain a target fused image.

In this embodiment, the obtaining module 301 obtains a first to-be-fused image and a second to-be-fused image, where the first to-be-fused image includes a plurality of first regions, and the second to-be-fused image includes a plurality of second regions. The obtaining module 301 obtains a first feature set according to the first to-be-fused image and obtains a second feature set according to the second to-be-fused image, where the first feature set includes a plurality of first encoding features and the first encoding features are in a one-to-one correspondence with the first regions, and the second feature set includes a plurality of second encoding features and the second encoding features are in a one-to-one correspondence with the second regions. The fusion module 302 performs, by using a shape fusion network model, fusion processing on the first to-be-fused image and the second to-be-fused image that are obtained by the obtaining module 301 to obtain a third to-be-fused image, where the third to-be-fused image includes at least one first encoding feature and at least one second encoding feature that are obtained by the obtaining module. The fusion module 302 performs fusion processing on the third to-be-fused image and the first to-be-fused image by using a condition fusion network model to obtain a target fused image.

In this embodiment of this application, an image fusion apparatus is provided. First, a first to-be-fused image and a second to-be-fused image are obtained, where the first to-be-fused image includes a plurality of first regions, and the second to-be-fused image includes a plurality of second regions. Then a first feature set is obtained according to the first to-be-fused image and a second feature set is obtained according to the second to-be-fused image, where the first feature set includes a plurality of first encoding features and the first encoding features are in a one-to-one correspondence with the first regions, and the second feature set includes a plurality of second encoding features and the second encoding features are in a one-to-one correspondence with the second regions. Fusion processing is then performed on the first to-be-fused image and the second to-be-fused image by using a shape fusion network model to obtain a third to-be-fused image, where the third to-be-fused image includes at least one first encoding feature and at least one second encoding feature. Finally, fusion processing may be performed on the third to-be-fused image and the first to-be-fused image by using a condition fusion network model to obtain a target fused image. According to the foregoing manner, corresponding features of local regions in images are extracted. Therefore, a local region in an image may be quickly changed, that is, the local region is replaced with a corresponding local region in another image to form a fused image. In addition, the remaining regions other than edited local regions in the fused image are consistent with those in an originally inputted image, causing the user to feel that there is no change between identity information of the fused image and identity information of the originally inputted image.

Based on the embodiment corresponding to FIG. 10, in another embodiment of the image fusion apparatus 30 according to an embodiment of this application, the obtaining module 301 is specifically configured to: perform encoding processing on the plurality of first regions in the first to-be-fused image by using a disentangling encoder to obtain the plurality of first encoding features, the disentangling encoder including a plurality of part-wise encoders, and each part-wise encoder being configured to encode one first region; and perform encoding processing on the plurality of second regions in the second to-be-fused image by using the disentangling encoder to obtain the plurality of second encoding features, the disentangling encoder including the plurality of part-wise encoders, and each part-wise encoder being configured to encode one second region.

An image encoding manner is also provided in an embodiment of this application. That is, encoding processing is performed on the plurality of first regions in the first to-be-fused image by using the disentangling encoder to obtain the plurality of first encoding features, and encoding processing is performed on the plurality of second regions in the second to-be-fused image by using the disentangling encoder to obtain the plurality of second encoding features. The disentangling encoder includes a plurality of part-wise encoders, and each part-wise encoder is configured to encode one second region. According to the foregoing manner, encoding processing is performed on different regions in the image by using the part-wise encoders, which can effectively ensure the consistency of image encoding and further help to perform subsequent prediction processing.

Figure 11:
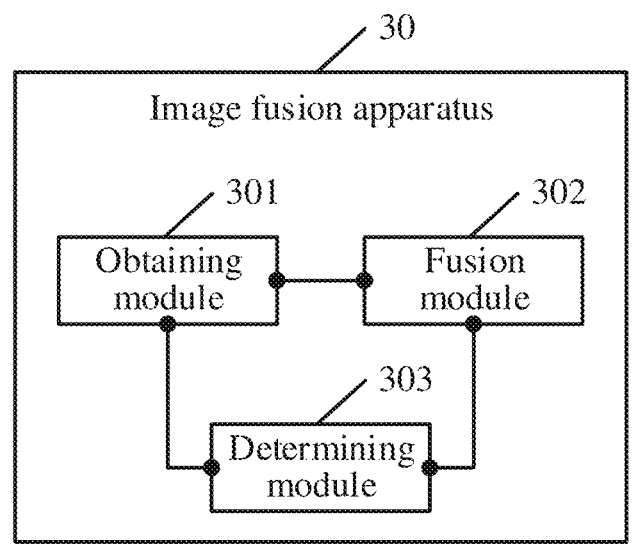
FIG. 11 is a schematic diagram of another embodiment of an image fusion apparatus according to an embodiment of this application.

Based on the embodiment corresponding to FIG. 10, referring to FIG. 11, in another embodiment of the image fusion apparatus 30 according to an embodiment of this application, the image fusion apparatus 30 further includes a determining module 303, where the determining module 303 is configured to determine a to-be-replaced region in the first to-be-fused image before the fusion module 302 performs fusion processing on the first to-be-fused image and the second to-be-fused image by using the shape fusion network model to obtain the third to-be-fused image, where the to-be-replaced region is one region in the plurality of first regions; and the obtaining module 301 is further configured to obtain a first to-be-replaced encoding feature in the first to-be-fused image according to the to-be-replaced region determined by the determining module 303 and obtain a second to-be-replaced encoding feature in the second to-be-fused image according to the to-be-replaced region determined by the determining module 303, where the first to-be-replaced encoding feature is one encoding feature in the plurality of first encoding features, and the second to-be-replaced encoding feature is one encoding feature in the plurality of second encoding features.

Based on the embodiment corresponding to FIG. 10 or FIG. 11, in another embodiment of the image fusion apparatus 30 according to an embodiment of this application, the fusion module 302 is specifically configured to: replace the first to-be-replaced encoding feature in the first to-be-fused image with the second to-be-replaced encoding feature in the second to-be-fused image by using the shape fusion network model to obtain a to-be-decoded image; and perform decoding processing on the to-be-decoded image by using the shape fusion network model to obtain the third to-be-fused image.

Figure 12:
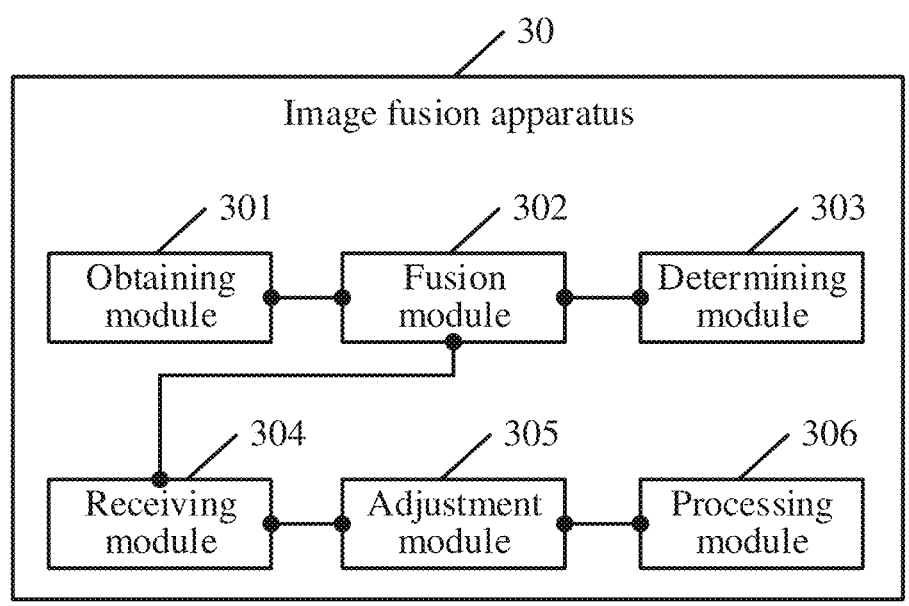
FIG. 12 is a schematic diagram of another embodiment of an image fusion apparatus according to an embodiment of this application.

Based on the embodiment corresponding to FIG. 10 or FIG. 11, referring to FIG. 12, in another embodiment of the image fusion apparatus 30 according to an embodiment of this application, the image fusion apparatus 30 further includes a receiving module 304, an adjustment module 305, and a processing module 306, where the receiving module 304 is configured to receive a region adjustment instruction through the third to-be-fused image after the fusion module 302 performs fusion processing on the first to-be-fused image and the second to-be-fused image by using the shape fusion network model to obtain the third to-be-fused image, where the region adjustment instruction is used for adjusting a shape of at least one region in the image;

the adjustment module 305 is configured to adjust the to-be-replaced region in response to the region adjustment instruction received by the receiving module 304, to obtain a target replaced region corresponding to the to-be-replaced region;

the processing module 306 is configured to process the third to-be-fused image according to the target replaced region obtained through adjustment of the adjustment module 305 to obtain a fourth to-be-fused image; and the fusion module 302 is specifically configured to perform fusion processing on the fourth to-be-fused image and the first to-be-fused image by using a condition fusion network model to obtain a target fused image.

Based on the embodiment corresponding to FIG. 10, FIG. 11 or FIG. 12, in another embodiment of the image fusion apparatus 30 according to an embodiment of this application, the fusion module 302 is specifically configured to: perform stitching processing on the third to-be-fused image and the first to-be-fused image to obtain a multi-channel feature image, where the multi-channel feature image is used for stitching color features of the at least two images; and obtain the target fused image corresponding to the multi-channel feature image by using the condition fusion network model.

Figure 13:
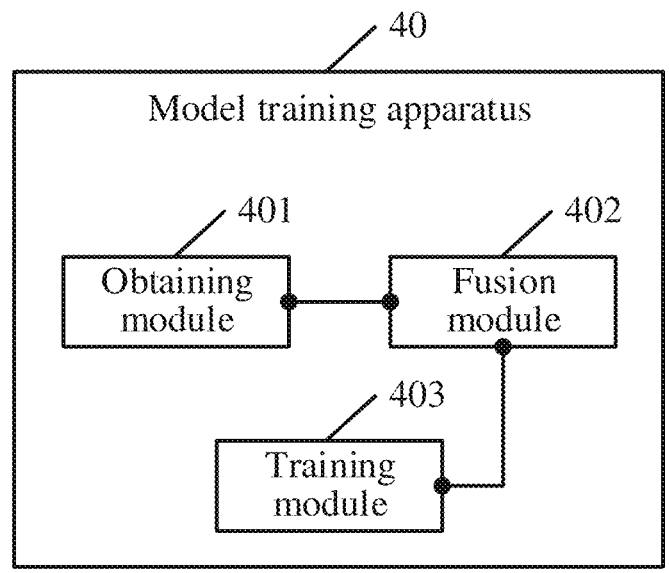
FIG. 13 is a schematic diagram of an embodiment of a model training apparatus according to an embodiment of this application.

A model training apparatus in this application is described below in detail. Referring to FIG. 13, FIG. 13 is a schematic diagram of an embodiment of a model training apparatus according to an embodiment of this application, and the model training apparatus 40 includes:

an obtaining module 401, configured to obtain a first feature set of a first to-be-trained image and a second feature set of a second to-be-trained image, the first to-be-trained image including a plurality of first training regions, the second to-be-trained image including a plurality of second training regions, the first feature set including a plurality of first encoding features and the first encoding features being in a one-to-one correspondence with the first training regions, and the second feature set including a plurality of second encoding features and the second encoding features being in a one-to-one correspondence with the second training regions;

a fusion module 402, configured to perform, by using a to-be-trained shape fusion network model, fusion processing on the first to-be-trained image and the second to-be-trained image that are obtained by the obtaining module 401 to obtain a third to-be-trained image, the third to-be-trained image including at least one first encoding feature and at least one second encoding feature that are obtained by the obtaining module;

the fusion module 402 being further configured to perform fusion processing on the third to-be-trained image and the first to-be-trained image by using a to-be-trained condition fusion network model to obtain a fourth to-be-trained image;

the fusion module 402 being further configured to perform fusion processing on the fourth to-be-trained image and the first to-be-trained image by using the to-be-trained shape fusion network model to obtain a fifth to-be-trained image, the fifth to-be-trained image and the first to-be-trained image having corresponding features; and the fusion module 402 being further configured to perform fusion processing on the fifth to-be-trained image and the fourth to-be-trained image by using the to-be-trained condition fusion network model to obtain a target image; and a training module 403, configured to train the to-be-trained shape fusion network model and the to-be-trained condition fusion network model by using a target loss function and the target image obtained through fusion of the fusion module 402 to obtain a shape fusion network model and a condition fusion network model.

In this embodiment, the obtaining module 401 obtains a first feature set of a first to-be-trained image and a second feature set of a second to-be-trained image, where the first to-be-trained image includes a plurality of first training regions, the second to-be-trained image includes a plurality of second training regions, the first feature set includes a plurality of first encoding features and the first encoding features are in a one-to-one correspondence with the first training regions, and the second feature set includes a plurality of second encoding features and the second encoding features are in a one-to-one correspondence with the second training regions. The fusion module 402 performs, by using a to-be-trained shape fusion network model, fusion processing on the first to-be-trained image and the second to-be-trained image that are obtained by the obtaining module 401 to obtain a third to-be-trained image, where the third to-be-trained image includes at least one first encoding feature and at least one second encoding feature that are obtained by the obtaining module. The fusion module 402 performs fusion processing on the third to-be-trained image and the first to-be-trained image by using a to-be-trained condition fusion network model to obtain a fourth to-be-trained image. The fusion module 402 performs fusion processing on the fourth to-be-trained image and the first to-be-trained image by using the to-be-trained shape fusion network model to obtain a fifth to-be-trained image, where the fifth to-be-trained image and the first to-be-trained image have corresponding features. The fusion module 402 performs fusion processing on the fifth to-be-trained image and the fourth to-be-trained image by using the to-be-trained condition fusion network model to obtain a target image. The training module 403 trains the to-be-trained shape fusion network model and the to-be-trained condition fusion network model by using a target loss function and the target image obtained through fusion of the fusion module 402 to obtain a shape fusion network model and a condition fusion network model.

In an embodiment of this application, a model training apparatus is provided. The model training apparatus first obtains a first feature set of a first to-be-trained image and a second feature set of a second to-be-trained image; then performs fusion processing on the first to-be-trained image and the second to-be-trained image by using a to-be-trained shape fusion network model to obtain a third to-be-trained image; then performs fusion processing on the third to-be-trained image and the first to-be-trained image by using a to-be-trained condition fusion network model to obtain a fourth to-be-trained image; then performs fusion processing on the fourth to-be-trained image and the first to-be-trained image by using the to-be-trained shape fusion network model to obtain a fifth to-be-trained image; performs fusion processing on the fifth to-be-trained image and the fourth to-be-trained image by using the to-be-trained condition fusion network model to obtain a target image; and finally trains the to-be-trained shape fusion network model and the to-be-trained condition fusion network model by using a target loss function and the target image to obtain a shape fusion network model and a condition fusion network model. According to the foregoing manner, models may be trained while ensuring the consistency between identity information of a fused image and identity information of an originally inputted image, thereby improving the reliability of model training.

Figure 14:
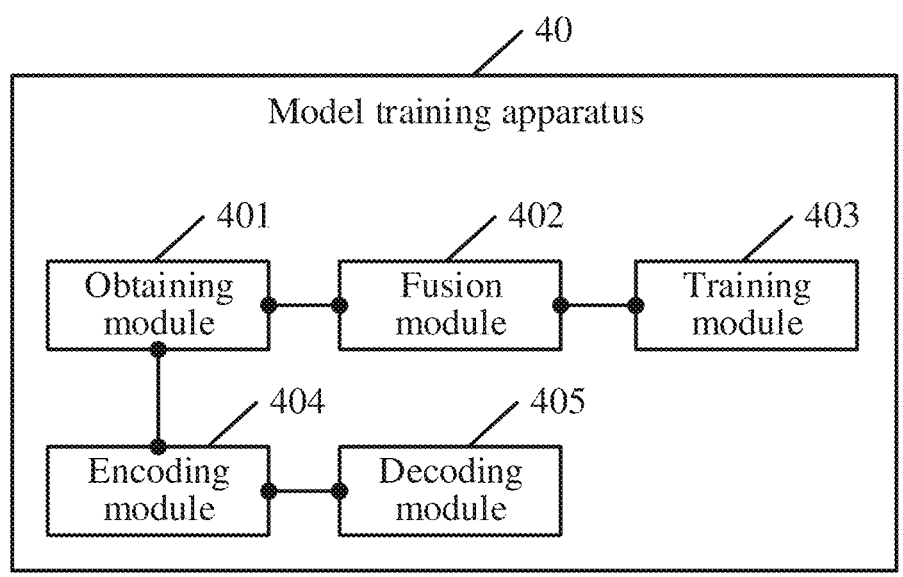
FIG. 14 is a schematic diagram of another embodiment of a model training apparatus according to an embodiment of this application.

Based on the embodiment corresponding to FIG. 13, referring to FIG. 14, in another embodiment of the model training apparatus 40 according to an embodiment of this application, the model training apparatus 40 further includes an encoding module 404 and a decoding module 405, where the obtaining module 401 is further configured to obtain a to-be-trained target image set before obtaining the first feature set of the first to-be-trained image and the second feature set of the second to-be-trained image, where the to-be-trained target image set includes at least one to-be-trained target image, and each to-be-trained target image includes at least one region;

the encoding module 404 is configured to perform, by using a to-be-trained disentangling encoder, encoding processing on each region of the to-be-trained target image in the to-be-trained target image set that is obtained by the obtaining module 401 to obtain an encoding result, where the to-be-trained disentangling encoder includes a plurality of to-be-trained part-wise encoders, and each to-be-trained part-wise encoder is configured to encode one region;

the decoding module 405 is configured to perform, by using a to-be-trained disentangling decoder, decoding processing on the encoding result encoded by the encoding module 404 to obtain a decoding result, where the to-be-trained disentangling decoder includes a plurality of to-be-trained part-wise decoders, and each to-be-trained part-wise decoder is configured to decode one region;

the training module 403 is further configured to train the to-be-trained disentangling encoder by using a loss function and the decoding result obtained through decoding of the decoding module 405 to obtain a disentangling encoder, where the disentangling encoder includes a plurality of part-wise encoders; and the obtaining module 401 is specifically configured to: obtain the first to-be-trained image and the second to-be-trained image;

perform encoding processing on the plurality of first regions in the first to-be-trained image by using the disentangling encoder to obtain the plurality of first encoding features, each part-wise encoder being configured to encode one first region; and perform encoding processing on the plurality of second regions in the second to-be-trained image by using the disentangling encoder to obtain the plurality of second encoding features, each part-wise encoder being configured to encode one second region.

Figure 15:
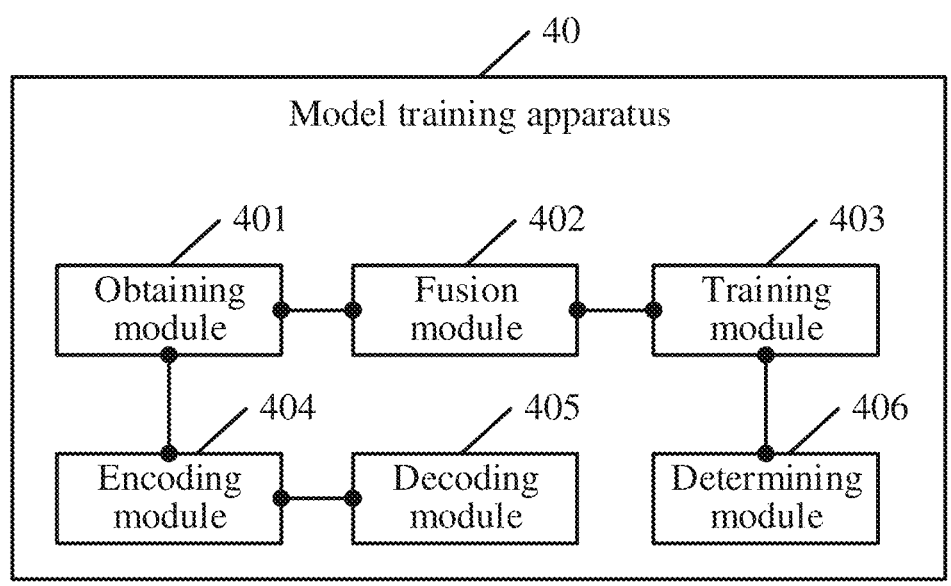
FIG. 15 is a schematic diagram of another embodiment of a model training apparatus according to an embodiment of this application.

Based on the embodiment corresponding to FIG. 13 or FIG. 14, referring to FIG. 15, in another embodiment of the model training apparatus 40 according to an embodiment of this application, the model training apparatus 40 further includes a determining module 406, where the determining module 406 is configured to determine a first loss function according to the fifth to-be-trained image and an actual image before the training module 403 trains the to-be-trained shape fusion network model and the to-be-trained condition fusion network model by using a target loss function and the target image to obtain a shape fusion network model and a condition fusion network model;

the determining module 406 is further configured to determine a second loss function according to the target image and the first to-be-trained image;

the determining module 406 is further configured to determine a third loss function according to the first to-be-trained image, the second to-be-trained image, the fourth to-be-trained image, and the target image; and the determining module 406 is further configured to determine the target loss function according to the first loss function, the second loss function, and the third loss function.

Based on the embodiment corresponding to FIG. 15, in another embodiment of the model training apparatus 40 according to an embodiment of this application, the determining module 406 is specifically configured to: calculate the first loss function in the following manner:

$$L_{cyc,L} = E_{y'_r y_A}[\|y'_r - y_A\|_1 + \lambda_{VGG}\|\phi(y'_r) - \phi(y_A)\|_1],$$

where $L_{cyc,L}$ represents the first loss function, E represents expected value calculation, $y'_r$ represents the fifth to-be-trained image, $y_A$ represents the actual image, $\lambda_{VGG}$ represents a loss proportion adjustment coefficient, and $\phi(\ )$ represents a feature outputted by a pre-trained network model;

calculate the second loss function in the following manner:

$$L_{cyc,I} = E_{x'_A x_A}[\|x'_A - x_A\|_1 + \lambda_{VGG}\|\phi(x'_A) - \phi(x_A)\|_1],$$

where $L_{cyc,I}$ represents the second loss function, $x'_A$ represents the target image, and $x_A$ represents the first to-be-trained image;

calculate the third loss function in the following manner:

$$L_{GAN} = E_{x_A x_B x_r x'_A}[\|D_I(x_A)\|_2^2 + \|D_I(x_B)\|_2^2 + \|1 - D_I(x_r)\|_2^2 + \|1 - D_I(x'_A)\|_2^2]$$

where $L_{GAN}$ represents the third loss function, $D_I$ represents a discriminative network, $x_B$ represents the second to-be-trained image, $x_r$ represents the fourth to-be-trained image, and $x'_A$ represents the target image; and calculate the target loss function in the following manner:

$L_{total} = L_{cyc,L} + L_{cyc,I} + L_{GAN}$, where $L_{total}$ represents the target loss function.

Again, in an embodiment of this application, a specific method for calculating a loss function is described. That is, the model training apparatus may calculate a first loss function according to the fifth to-be-trained image and an actual image, then calculate a second loss function according to the target image and the first to-be-trained image, then calculate a third loss function according to the first to-be-trained image, the second to-be-trained image, the fourth to-be-trained image, and the target image, and finally calculate the target loss function according to the first loss function, the second loss function, and the third loss function. According to the foregoing manner, a specific basis is provided for implementation of the solution, thereby improving the feasibility and operability of the solution.

Figure 16:
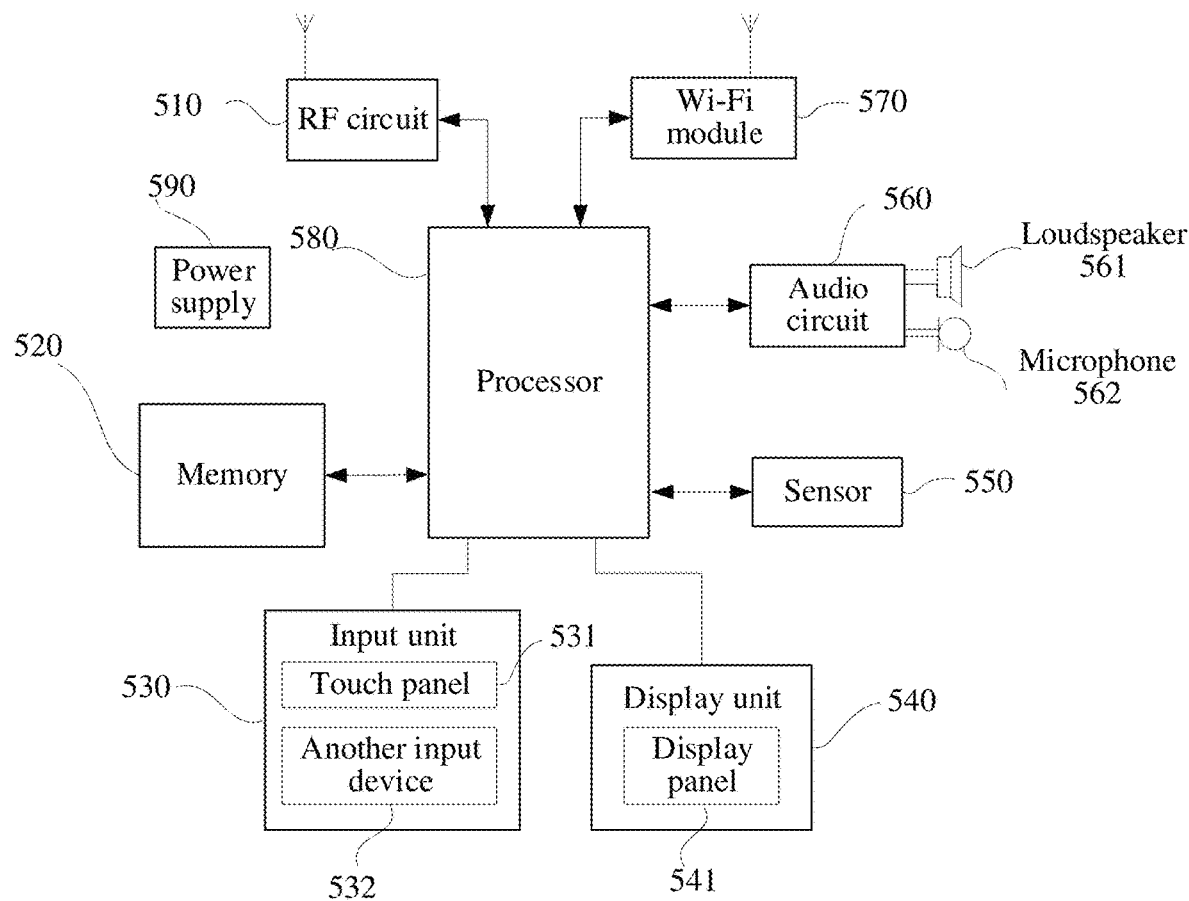
FIG. 16 is a schematic diagram of an embodiment of a terminal device according to an embodiment of this application.

As shown in FIG. 16, an embodiment of this application further provides another image fusion apparatus. For ease of description, only parts related to this embodiment of this application are shown. For specific technical details that are not disclosed, refer to the method part of the embodiments of this application. The terminal device may be any terminal device including a mobile phone, a tablet computer, a personal digital assistant (PDA), a point of sales (POS), and an on-board computer, and the terminal device being a mobile phone is used as an example.

FIG. 16 is a block diagram of the structure of a part of a mobile phone related to a terminal device according to an embodiment of this application. Referring to FIG. 16, the mobile phone includes a memory 520 and a processor 580. The mobile phone may further include components such as a radio frequency (RF) circuit 510, an input unit 530, a display unit 540, a sensor 550, an audio circuit 560, a wireless fidelity (Wi-Fi) module 570, and a power supply 590. A person skilled in the art may understand that the structure of the mobile phone shown in FIG. 16 does not constitute a limitation on the mobile phone, and the mobile phone may include more or fewer components than those shown in the figure, or some components may be combined, or a different component deployment may be used.

The following makes a specific description of components of the mobile phone with reference to FIG. 16.

The RF circuit 510 may be configured to receive and send signals during an information receiving and sending process or a call process. Specifically, the RF circuit 510 receives downlink information from a base station, then delivers the downlink information to the processor 580 for processing, and sends uplink-related data to the base station. Generally, the RF circuit 510 includes, but is not limited to, an antenna, at least one amplifier, a transceiver, a coupler, a low noise amplifier (LNA), and a duplexer. In addition, the RF circuit 510 may also communicate with a network and another device through wireless communication. The wireless communication may use any communication standard or protocol, including but not limited to Global System for Mobile Communications (GSM), General Packet Radio Service (GPRS), Code Division Multiple Access (CDMA), Wideband Code Division Multiple Access (WCDMA), Long Term Evolution (LTE), email, Short Messaging Service (SMS), and the like.

The memory 520 may be configured to store a plurality of instructions, in other words, to store a software program and a module. The processor 580 runs the plurality of instructions stored in the memory 520, to implement various functional applications and data processing of the mobile phone. The memory 520 may mainly include a program storage area and a data storage area. The program storage area may store an operating system, an application program required by at least one function (for example, a sound playback function and an image display function), and the like. The data storage area may store data (for example, audio data and an address book) created according to the use of the mobile phone, and the like. In addition, the memory 520 may include a high speed random access memory (RAM), and may also include a non-volatile memory, for example, at least one magnetic disk storage device, a flash memory, or another volatile solid-state storage device.

The input unit 530 may be configured to receive inputted digit or character information, and generate a keyboard signal input related to the user setting and function control of the mobile phone. Specifically, the input unit 530 may include a touch panel 531 and another input device 532. The touch panel 531, also referred to as a touchscreen, may collect a touch operation of a user on or near the touch panel (such as an operation of a user on or near the touch panel 531 by using any suitable object or accessory such as a finger or a stylus), and drive a corresponding connection apparatus according to a preset program. The touch panel 531 may include two parts: a touch detection apparatus and a touch controller. The touch detection apparatus detects a touch orientation of the user, detects a signal generated by the touch operation, and transfers the signal to the touch controller. The touch controller receives the touch information from the touch detection apparatus, converts the touch information into touch point coordinates, and sends the touch point coordinates to the processor 580. Moreover, the touch controller may receive and execute a command sent from the processor 580. In addition, the touch panel 531 may be implemented by using various types, such as a resistive type, a capacitive type, an infrared type, and a surface acoustic wave type. In addition to the touch panel 531, the input unit 530 may further include the another input device 532. Specifically, the another input device 532 may include, but is not limited to, one or more of a physical keyboard, a functional key (such as a volume control key or a switch key), a track ball, a mouse, and a joystick.

The display unit 540 may be configured to display information inputted by the user or information provided for the user, and various menus of the mobile phone. The display unit 540 may include a display panel 541. The display panel 541 may be configured in the form of a liquid crystal display (LCD), an organic light-emitting diode (OLED), or the like. Further, the touch panel 531 may cover the display panel 541. After detecting a touch operation on or near the touch panel, the touch panel 531 transfers the operation to the processor 580 to determine a touch event type. Then the processor 580 provides corresponding visual output on the display panel 541 according to the touch event type. Although in FIG. 16, the touch panel 531 and the display panel 541 are used as two separate parts to implement input and output functions of the mobile phone, in some embodiments, the touch panel 531 and the display panel 541 may be integrated to implement the input and output functions of the mobile phone.

The mobile phone may further include at least one sensor 550 such as an optical sensor, a motion sensor, and other sensors. Specifically, the optical sensor may include an ambient light sensor and a proximity sensor, where the ambient light sensor may adjust luminance of the display panel 541 according to the luminance of the ambient light, and the proximity sensor may switch off the display panel 541 and/or backlight when the mobile phone is moved to the ear. As one type of motion sensor, an acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 560, a loudspeaker 561, and a microphone 562 may provide audio interfaces between the user and the mobile phone. The audio circuit 560 may convert received audio data into an electrical signal and transmit the electrical signal to the loudspeaker 561. The loudspeaker 561 converts the electrical signal into a sound signal for output. On the other hand, the microphone 562 converts a collected sound signal into an electrical signal. The audio circuit 560 receives the electrical signal, converts the electrical signal into audio data, and outputs the audio data to the processor 580 for processing. Then, the processor 580 sends the audio data to, for example, another mobile phone by using the RF circuit 510, or outputs the audio data to the memory 520 for further processing.

Wi-Fi is a short distance wireless transmission technology. The mobile phone may help, by using the Wi-Fi module 570, a user to receive and send an e-mail, browse a web page, access streaming media, and the like, which provides wireless broadband Internet access for the user. Although FIG. 16 shows the Wi-Fi module 570, it may be understood that the Wi-Fi module 570 is not a necessary component of the mobile phone, and the Wi-Fi module 570 may be omitted as required provided that the scope of the essence of this application is not changed.

The processor 580 is a control center of the mobile phone, and is connected to various parts of the entire mobile phone by using various interfaces and lines. By running or executing a software program and/or module stored in the memory 520, and invoking data stored in the memory 520, the processor 580 executes various functions of the mobile phone and performs data processing, thereby monitoring the entire mobile phone. Optionally, the processor 580 may include one or more processing units. The processor 580 may integrate an application processor and a modem processor. The application processor mainly processes an operating system, a user interface, an application program, and the like. The modem processor mainly processes wireless communication. It may be understood that the foregoing modem processor may either not be integrated into the processor 580.

The mobile phone further includes the power supply 590 (such as a battery) for supplying power to the components. The power supply may be logically connected to the processor 580 by using a power management system, thereby implementing functions such as charging, discharging, and power consumption management by using the power management system.

Although not shown in the figure, the mobile phone may further include a camera, a Bluetooth module, and the like, and details are not described herein again.

In an embodiment of this application, by running the plurality of instructions stored in the memory 520, the processor 580 included in the terminal device is configured to perform the following steps:

obtaining a first to-be-fused image and a second to-be-fused image, the first to-be-fused image including a plurality of first regions, and the second to-be-fused image including a plurality of second regions;

obtaining a first feature set according to the first to-be-fused image and obtaining a second feature set according to the second to-be-fused image, the first feature set including a plurality of first encoding features and the first encoding features being in a one-to-one correspondence with the first regions, and the second feature set including a plurality of second encoding features and the second encoding features being in a one-to-one correspondence with the second regions;

performing fusion processing on the first to-be-fused image and the second to-be-fused image by using a shape fusion network model to obtain a third to-be-fused image, the third to-be-fused image including at least one first encoding feature and at least one second encoding feature; and performing fusion processing on the third to-be-fused image and the first to-be-fused image by using a condition fusion network model to obtain a target fused image.

By running the plurality of instructions stored in the memory 520, the processor 580 is further configured to perform the following steps:

performing encoding processing on the plurality of first regions in the first to-be-fused image by using a disentangling encoder to obtain the plurality of first encoding features, the disentangling encoder including a plurality of part-wise encoders, and each part-wise encoder being configured to encode one first region; and performing encoding processing on the plurality of second regions in the second to-be-fused image by using the disentangling encoder to obtain the plurality of second encoding features, the disentangling encoder including the plurality of part-wise encoders, and each part-wise encoder being configured to encode one second region.

By running the plurality of instructions stored in the memory 520, the processor 580 is further configured to perform the following steps:

determining a to-be-replaced region in the first to-be-fused image, the to-be-replaced region being one region in the plurality of first regions; and obtaining a first to-be-replaced encoding feature in the first to-be-fused image according to the to-be-replaced region and obtaining a second to-be-replaced encoding feature in the second to-be-fused image according to the to-be-replaced region, the first to-be-replaced encoding feature being one encoding feature in the plurality of first encoding features, and the second to-be-replaced encoding feature being one encoding feature in the plurality of second encoding features.

By running the plurality of instructions stored in the memory 520, the processor 580 is specifically configured to perform the following steps:

replacing the first to-be-replaced encoding feature in the first to-be-fused image with the second to-be-replaced encoding feature in the second to-be-fused image by using the shape fusion network model to obtain a to-be-decoded image; and performing decoding processing on the to-be-decoded image by using the shape fusion network model to obtain the third to-be-fused image.

By running the plurality of instructions stored in the memory 520, the processor 580 is further configured to perform the following steps:

receiving a region adjustment instruction through the third to-be-fused image, the region adjustment instruction being used for adjusting a shape of at least one region in the image;

adjusting the to-be-replaced region in response to the region adjustment instruction, to obtain a target replaced region corresponding to the to-be-replaced region;

processing the third to-be-fused image according to the target replaced region to obtain a fourth to-be-fused image; and performing fusion processing on the fourth to-be-fused image and the first to-be-fused image by using a condition fusion network model to obtain a target fused image.

By running the plurality of instructions stored in the memory 520, the processor 580 is further configured to perform the following steps:

performing stitching processing on the third to-be-fused image and the first to-be-fused image to obtain a multi-channel feature image, the multi-channel feature image being used for stitching color features of the at least two images; and obtaining the target fused image corresponding to the multi-channel feature image by using the condition fusion network model.

Figure 17:
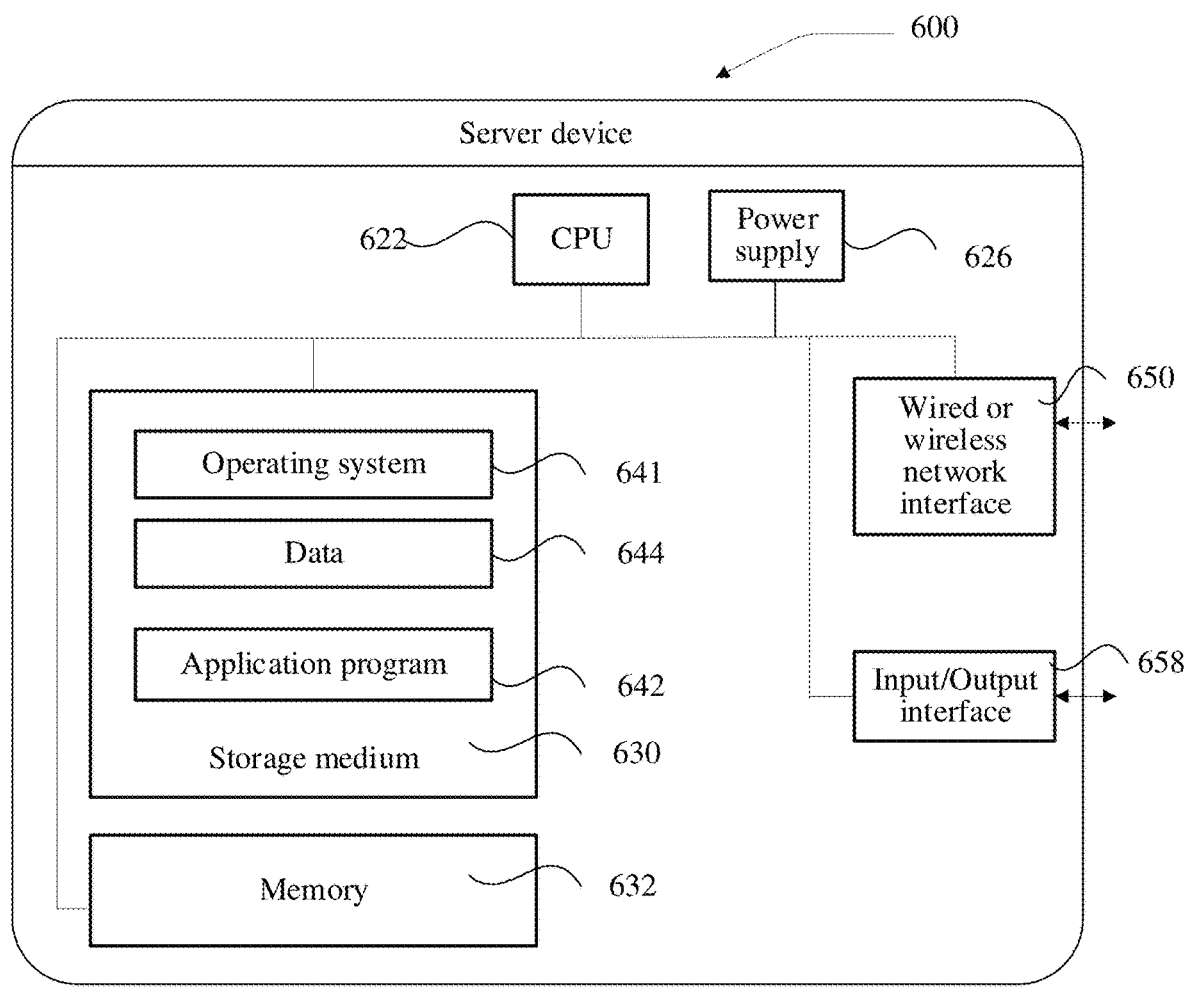
FIG. 17 is a schematic diagram of an embodiment of a server device according to an embodiment of this application.

FIG. 17 is a schematic structural diagram of a server device according to an embodiment of this application. The server device 600 may vary greatly due to different configurations or performance, and may include one or more central processing units (CPUs) 622 (for example, one or more processors) and a memory 632. The server device 600 may further include one or more storage media 630 (for example, one or more mass storage devices) that store an application program 642 or data 644. The memory 632 and the storage medium 630 may be transient storage or permanent storage. Both the memory 632 and the storage medium 630 may store a plurality of instructions or a program. The program (or the plurality of instructions) stored in the memory 632 or in the storage medium 630 may include one or more modules (not shown in the figure), and each module may include a series of instruction operations on the server device. Still further, the CPU 622 may be configured to communicate with the memory 632 or the storage medium 630 to perform the series of instruction operations in the memory 632 or in the storage medium 630 on the server device 600.

The server device 600 may further include one or more power supplies 626, one or more wired or wireless network interfaces 650, one or more input/output interfaces 658, and/or one or more operating systems 641, for example, Windows Server™, Mac OS X™ Unix™, Linux™, or FreeBSD™.

The steps performed by the server device in the foregoing embodiments may be based on the server device structure shown in FIG. 17.

In an embodiment of this application, by running the plurality of instructions stored in the memory 632 or in the storage medium 630, the CPU 622 included in the server device is configured to perform the following steps:

obtaining a first feature set of a first to-be-trained image and a second feature set of a second to-be-trained image, the first to-be-trained image including a plurality of first training regions, the second to-be-trained image including a plurality of second training regions, the first feature set including a plurality of first encoding features and the first encoding features being in a one-to-one correspondence with the first training regions, and the second feature set including a plurality of second encoding features and the second encoding features being in a one-to-one correspondence with the second training regions;

performing fusion processing on the first to-be-trained image and the second to-be-trained image by using a to-be-trained shape fusion network model to obtain a third to-be-trained image, the third to-be-trained image including at least one first encoding feature and at least one second encoding feature;

performing fusion processing on the third to-be-trained image and the first to-be-trained image by using a to-be-trained condition fusion network model to obtain a fourth to-be-trained image;

performing fusion processing on the fourth to-be-trained image and the first to-be-trained image by using the to-be-trained shape fusion network model to obtain a fifth to-be-trained image, the fifth to-be-trained image and the first to-be-trained image having corresponding features;

performing fusion processing on the fifth to-be-trained image and the fourth to-be-trained image by using the to-be-trained condition fusion network model to obtain a target image; and training the to-be-trained shape fusion network model and the to-be-trained condition fusion network model by using a target loss function and the target image to obtain a shape fusion network model and a condition fusion network model.

By running the plurality of instructions stored in the memory 632 or in the storage medium 630, the CPU 622 is further configured to perform the following steps:

obtaining a to-be-trained target image set, the to-be-trained target image set including at least one to-be-trained target image, and each to-be-trained target image including at least one region;

performing encoding processing on each region of the to-be-trained target image in the to-be-trained target image set by using a to-be-trained disentangling encoder to obtain an encoding result, the to-be-trained disentangling encoder including a plurality of to-be-trained part-wise encoders, and each to-be-trained part-wise encoder being configured to encode one region;

performing decoding processing on the encoding result by using a to-be-trained disentangling decoder to obtain a decoding result, the to-be-trained disentangling decoder including a plurality of to-be-trained part-wise decoders, and each to-be-trained part-wise decoder being configured to decode one region;

training the to-be-trained disentangling encoder by using a loss function and the decoding result to obtain a disentangling encoder, the disentangling encoder including a plurality of part-wise encoders;

obtaining the first to-be-trained image and the second to-be-trained image;

performing encoding processing on the plurality of first regions in the first to-be-trained image by using the disentangling encoder to obtain the plurality of first encoding features, each part-wise encoder being configured to encode one first region; and performing encoding processing on the plurality of second regions in the second to-be-trained image by using the disentangling encoder to obtain the plurality of second encoding features, each part-wise encoder being configured to encode one second region.

By running the plurality of instructions stored in the memory 632 or in the storage medium 630, the CPU 622 is further configured to perform the following steps:

determining a first loss function according to the fifth to-be-trained image and an actual image;

determining a second loss function according to the target image and the first to-be-trained image;

determining a third loss function according to the first to-be-trained image, the second to-be-trained image, the fourth to-be-trained image, and the target image; and determining the target loss function according to the first loss function, the second loss function, and the third loss function.

By running the plurality of instructions stored in the memory 632 or in the storage medium 630, the CPU 622 is further configured to perform the following steps:

calculating the first loss function in the following manner:

$$L_{cyc,L} = E_{y'_r,y_A}[\|y'_r - y_A\|_1 + \lambda_{VGG}\|\phi(y'_r) - \phi(y_A)\|_1],$$

where $L_{cyc,L}$ represents the first loss function, E represents expected value calculation, $y'_r$ represents the fifth to-be-trained image, $y_A$ represents the actual image, $\lambda_{VGG}$ represents a loss proportion adjustment coefficient, and $\phi(\ )$ represents a feature outputted by a pre-trained network model;

calculating the second loss function in the following manner:

$$L_{cyc,I} = E_{x'_A,x_A}[\|x'_A - x_A\|_1 + \lambda_{VGG}\|\phi(x'_A) - \phi(x_A)\|_1],$$

where $L_{cyc,I}$ represents the second loss function, $x'_A$ represents the target image, and $x_A$ represents the first to-be-trained image;

calculating the third loss function in the following manner:

$$L_{GAN} = E_{x_A x_B x_r x'_A}\left[\|D_I(x_A)\|_2^2 + \|D_I(x_B)\|_2^2 + \|1 - D_I(x_r)\|_2^2 + \|1 - D_I(x'_A)\|_2^2\right]$$

where
$L_{GAN}$ represents the third loss function, $D_I$ represents a discriminative network, $x_B$ represents the second to-be-trained image, $x_r$ represents the fourth to-be-trained image, and $x'_A$ represents the target image; and
calculating the target loss function in the following manner:

$$L_{total} = L_{cyc,L} + L_{cyc,I} + L_{GAN}, \text{ where}$$

$L_{total}$ represents the target loss function.

A person skilled in the art can clearly understand that for convenience and conciseness of description, for specific working processes of the foregoing systems, devices and units, reference may be made to the corresponding processes in the foregoing method embodiments, and details are not described herein again.

In the several embodiments provided in this application, it is to be understood that the disclosed system, apparatus, and method may be implemented in other manners. For example, the described apparatus embodiment is merely an example. For example, the unit division is merely a logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to actual requirements to achieve the objectives of the solutions of the embodiments.

In addition, functional units in the embodiments of this application may be integrated into one processing unit, or each of the units may be physically separated, or two or more units may be integrated into one unit. The integrated unit may be implemented in the form of hardware, or may be implemented in the form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the related art, or all or some of the technical solutions may be implemented in the form of a software product. The computer software product is stored in a storage medium and includes several instructions for instructing a computer device (which may be a personal computer, a server device, a network device, or the like) to perform all or some of the steps of the methods described in the embodiments of this application, for example, the image fusion method and the model training method described above. The foregoing storage medium includes: any medium that can store program code, such as a USB flash drive, a removable hard disk, a read-only memory (ROM), a RAM, a magnetic disk, a compact disc, or the like.

The foregoing embodiments are merely intended for describing the technical solutions of this application, but not for limiting this application. Although this application is described in detail with reference to the foregoing embodiments, a person of ordinary skill in the art is to understand that they may still make modifications to the technical solutions described in the foregoing embodiments or make equivalent replacements to some technical features thereof, without departing from the spirit and scope of the technical solutions of the embodiments of this application.

What is claimed is:

1. A method for fusing at least one image, the method comprising:
obtaining, by a device comprising a memory storing instructions and a processor in communication with the memory, a first to-be-fused image and a second to-be-fused image, the first to-be-fused image comprising a plurality of first regions, and the second to-be-fused image comprising a plurality of second regions;
obtaining, by the device, a first feature set according to the first to-be-fused image and obtaining a second feature set according to the second to-be-fused image, the first feature set comprising a plurality of first encoding features and the second feature set comprising a plurality of second encoding features, the plurality of the first encoding features being in a one-to-one correspondence with the plurality of the first regions and the plurality of the second encoding features being in a one-to-one correspondence with the plurality of the second regions;
performing, by the device, first fusion processing on the first to-be-fused image and the second to-be-fused image by using a shape fusion network model to obtain a third to-be-fused image, the third to-be-fused image comprising at least one first encoding feature and at least one second encoding feature; and
performing, by the device, second fusion processing on the third to-be-fused image and the first to-be-fused image by using a condition fusion network model to obtain a target fused image,
wherein before the performing the first fusion processing on the first to-be-fused image and the second to-be-fused image by using the shape fusion network model to obtain the third to-be-fused image, the method further comprises:
determining, by the device, a to-be-replaced region in the first to-be-fused image, the to-be-replaced region being one region in the plurality of first regions; and
obtaining, by the device, a first to-be-replaced encoding feature in the first to-be-fused image according to the to-be-replaced region and obtaining a second to-be-replaced encoding feature in the second to-be-fused image according to the to-be-replaced region, the first to-be-replaced encoding feature being one encoding feature in the plurality of first encoding features, and the second to-be-replaced encoding feature being one encoding feature in the plurality of second encoding features.

2. The method according to claim 1, wherein the obtaining the first feature set according to the first to-be-fused image comprises:
performing, by the device, encoding processing on the plurality of first regions in the first to-be-fused image by using a disentangling encoder to obtain the plurality of first encoding features, the disentangling encoder comprising a plurality of part-wise encoders, and each part-wise encoder being configured to encode one first region.

3. The method according to claim 1, wherein the performing the first fusion processing on the first to-be-fused image and the second to-be-fused image by using the shape fusion network model to obtain the third to-be-fused image comprises:
replacing, by the device, the first to-be-replaced encoding feature in the first to-be-fused image with the second to-be-replaced encoding feature in the second to-be-fused image by using the shape fusion network model to obtain a to-be-decoded image; and
performing, by the device, decoding processing on the to-be-decoded image by using the shape fusion network model to obtain the third to-be-fused image.

4. The method according to claim 1, wherein after the performing the first fusion processing on the first to-be-fused image and the second to-be-fused image by using the shape fusion network model to obtain the third to-be-fused image, the method further comprises:
receiving, by the device, a region adjustment instruction through the third to-be-fused image, the region adjustment instruction being used for adjusting a shape of at least one region in the third to-be-fused image;
adjusting, by the device, the to-be-replaced region in response to the region adjustment instruction, to obtain a target replaced region corresponding to the to-be-replaced region; and
processing, by the device, the third to-be-fused image according to the target replaced region to obtain a fourth to-be-fused image.

5. The method according to claim 4, wherein the performing the second fusion processing on the third to-be-fused image and the first to-be-fused image by using the condition fusion network model to obtain the target fused image comprises:
performing, by the device, third fusion processing on the fourth to-be-fused image and the first to-be-fused image by using the condition fusion network model to obtain the target fused image.

6. The method according to claim 1, wherein the performing the second fusion processing on the third to-be-fused image and the first to-be-fused image by using the condition fusion network model to obtain the target fused image comprises:
performing, by the device, stitching processing on the third to-be-fused image and the first to-be-fused image to obtain a multi-channel feature image, the multi-channel feature image being used for stitching color features of at least two images; and
obtaining, by the device, the target fused image corresponding to the multi-channel feature image by using the condition fusion network model.

7. An apparatus for fusing at least one image, the apparatus comprising:
a memory storing instructions; and
a processor in communication with the memory, wherein, when the processor executes the instructions, the processor is configured to cause the apparats to:
obtain a first to-be-fused image and a second to-be-fused image, the first to-be-fused image comprising a plurality of first regions, and the second to-be-fused image comprising a plurality of second regions,
obtain a first feature set according to the first to-be-fused image and obtain a second feature set according to the second to-be-fused image, the first feature set comprising a plurality of first encoding features and the second feature set comprising a plurality of second encoding features, the plurality of the first encoding features being in a one-to-one correspondence with the plurality of the first regions and the plurality of the second encoding features being in a one-to-one correspondence with the plurality of the second regions,
perform first fusion processing on the first to-be-fused image and the second to-be-fused image by using a shape fusion network model to obtain a third to-be-fused image, the third to-be-fused image comprising at least one first encoding feature and at least one second encoding feature, and
perform second fusion processing on the third to-be-fused image and the first to-be-fused image by using a condition fusion network model to obtain a target fused image,
wherein, before the processor is configured to cause the apparats to perform the first fusion processing on the first to-be-fused image and the second to-be-fused image by using the shape fusion network model to obtain the third to-be-fused image, the processor is configured to cause the apparats to:
determine a to-be-replaced region in the first to-be-fused image, the to-be-replaced region being one region in the plurality of first regions; and
obtain a first to-be-replaced encoding feature in the first to-be-fused image according to the to-be-replaced region and obtain a second to-be-replaced encoding feature in the second to-be-fused image according to the to-be-replaced region, the first to-be-replaced encoding feature being one encoding feature in the plurality of first encoding features, and the second to-be-replaced encoding feature being one encoding feature in the plurality of second encoding features.

8. The apparatus according to claim 7, wherein, when the processor is configured to cause the apparats to obtain the first feature set according to the first to-be-fused image, the processor is configured to cause the apparats to:
perform encoding processing on the plurality of first regions in the first to-be-fused image by using a disentangling encoder to obtain the plurality of first encoding features, the disentangling encoder comprising a plurality of part-wise encoders, and each part-wise encoder being configured to encode one first region.

9. The apparatus according to claim 7, wherein, when the processor is configured to cause the apparats to perform the first fusion processing on the first to-be-fused image and the second to-be-fused image by using the shape fusion network model to obtain the third to-be-fused image, the processor is configured to cause the apparats to:
replace the first to-be-replaced encoding feature in the first to-be-fused image with the second to-be-replaced encoding feature in the second to-be-fused image by using the shape fusion network model to obtain a to-be-decoded image; and
perform decoding processing on the to-be-decoded image by using the shape fusion network model to obtain the third to-be-fused image.

10. The apparatus according to claim 7, wherein, after the processor is configured to cause the apparats to perform the first fusion processing on the first to-be-fused image and the second to-be-fused image by using the shape fusion network model to obtain the third to-be-fused image, the processor is configured to cause the apparats to:
receive a region adjustment instruction through the third to-be-fused image, the region adjustment instruction being used for adjusting a shape of at least one region in the third to-be-fused image;
adjust the to-be-replaced region in response to the region adjustment instruction, to obtain a target replaced region corresponding to the to-be-replaced region; and
process the third to-be-fused image according to the target replaced region to obtain a fourth to-be-fused image.

11. The apparatus according to claim 10, wherein, when the processor is configured to cause the apparats to perform the second fusion processing on the third to-be-fused image and the first to-be-fused image by using the condition fusion network model to obtain the target fused image, the processor is configured to cause the apparats to:
perform third fusion processing on the fourth to-be-fused image and the first to-be-fused image by using the condition fusion network model to obtain the target fused image.

12. The apparatus according to claim 7, wherein, when the processor is configured to cause the apparats to perform the second fusion processing on the third to-be-fused image and the first to-be-fused image by using the condition fusion network model to obtain the target fused image, the processor is configured to cause the apparats to:
perform stitching processing on the third to-be-fused image and the first to-be-fused image to obtain a multi-channel feature image, the multi-channel feature image being used for stitching color features of at least two images; and
obtain the target fused image corresponding to the multi-channel feature image by using the condition fusion network model.

13. A non-transitory computer-readable storage medium storing computer readable instructions, wherein, the computer readable instructions, when executed by a processor, are configured to cause the processor to perform:
obtaining a first to-be-fused image and a second to-be-fused image, the first to-be-fused image comprising a plurality of first regions, and the second to-be-fused image comprising a plurality of second regions;
obtaining a first feature set according to the first to-be-fused image and obtaining a second feature set according to the second to-be-fused image, the first feature set comprising a plurality of first encoding features and the second feature set comprising a plurality of second encoding features, the plurality of the first encoding features being in a one-to-one correspondence with the plurality of the first regions and the plurality of the second encoding features being in a one-to-one correspondence with the plurality of the second regions;
performing first fusion processing on the first to-be-fused image and the second to-be-fused image by using a shape fusion network model to obtain a third to-be-fused image, the third to-be-fused image comprising at least one first encoding feature and at least one second encoding feature; and
performing second fusion processing on the third to-be-fused image and the first to-be-fused image by using a condition fusion network model to obtain a target fused image,
wherein, before the computer readable instructions are configured to cause the processor to perform the first fusion processing on the first to-be-fused image and the second to-be-fused image by using the shape fusion network model to obtain the third to-be-fused image, the computer readable instructions are configured to cause the processor to perform:
determining a to-be-replaced region in the first to-be-fused image, the to-be-replaced region being one region in the plurality of first regions; and
obtaining a first to-be-replaced encoding feature in the first to-be-fused image according to the to-be-replaced region and obtaining a second to-be-replaced encoding feature in the second to-be-fused image according to the to-be-replaced region, the first to-be-replaced encoding feature being one encoding feature in the plurality of first encoding features, and the second to-be-replaced encoding feature being one encoding feature in the plurality of second encoding features.

14. The non-transitory computer readable storage medium according to claim 13, wherein, when the computer readable instructions are configured to cause the processor to perform obtaining the first feature set according to the first to-be-fused image, the computer readable instructions are configured to cause the processor to perform:
performing encoding processing on the plurality of first regions in the first to-be-fused image by using a disentangling encoder to obtain the plurality of first encoding features, the disentangling encoder comprising a plurality of part-wise encoders, and each part-wise encoder being configured to encode one first region.

15. The non-transitory computer readable storage medium according to claim 13, wherein, when the computer readable instructions are configured to cause the processor to perform performing the first fusion processing on the first to-be-fused image and the second to-be-fused image by using the shape fusion network model to obtain the third to-be-fused image, the computer readable instructions are configured to cause the processor to perform:
replacing the first to-be-replaced encoding feature in the first to-be-fused image with the second to-be-replaced encoding feature in the second to-be-fused image by using the shape fusion network model to obtain a to-be-decoded image; and
performing decoding processing on the to-be-decoded image by using the shape fusion network model to obtain the third to-be-fused image.

16. The non-transitory computer readable storage medium according to claim 13, wherein, after the computer readable instructions are configured to cause the processor to perform the first fusion processing on the first to-be-fused image and the second to-be-fused image by using the shape fusion network model to obtain the third to-be-fused image, the computer readable instructions are configured to cause the processor to perform:
receiving a region adjustment instruction through the third to-be-fused image, the region adjustment instruction being used for adjusting a shape of at least one region in the third to-be-fused image;
adjusting the to-be-replaced region in response to the region adjustment instruction, to obtain a target replaced region corresponding to the to-be-replaced region; and
processing the third to-be-fused image according to the target replaced region to obtain a fourth to-be-fused image.

17. The non-transitory computer readable storage medium according to claim 16, wherein, when the computer readable instructions are configured to cause the processor to perform performing the second fusion processing on the third to-befused image and the first to-be-fused image by using the condition fusion network model to obtain the target fused image, the computer readable instructions are configured to cause the processor to perform:
    performing third fusion processing on the fourth to-be-fused image and the first to-be-fused image by using the condition fusion network model to obtain the target fused image.

* * * * *